W. W. HOPKINS.
CALCULATING MACHINE.
APPLICATION FILED APR. 9, 1909.

1,070,034.

Patented Aug. 12, 1913.
12 SHEETS—SHEET 6.

Witnesses:
Alma Gebhart
M. O. Smith

Inventor:
William W. Hopkins
by
G. R. Cornwall Atty.

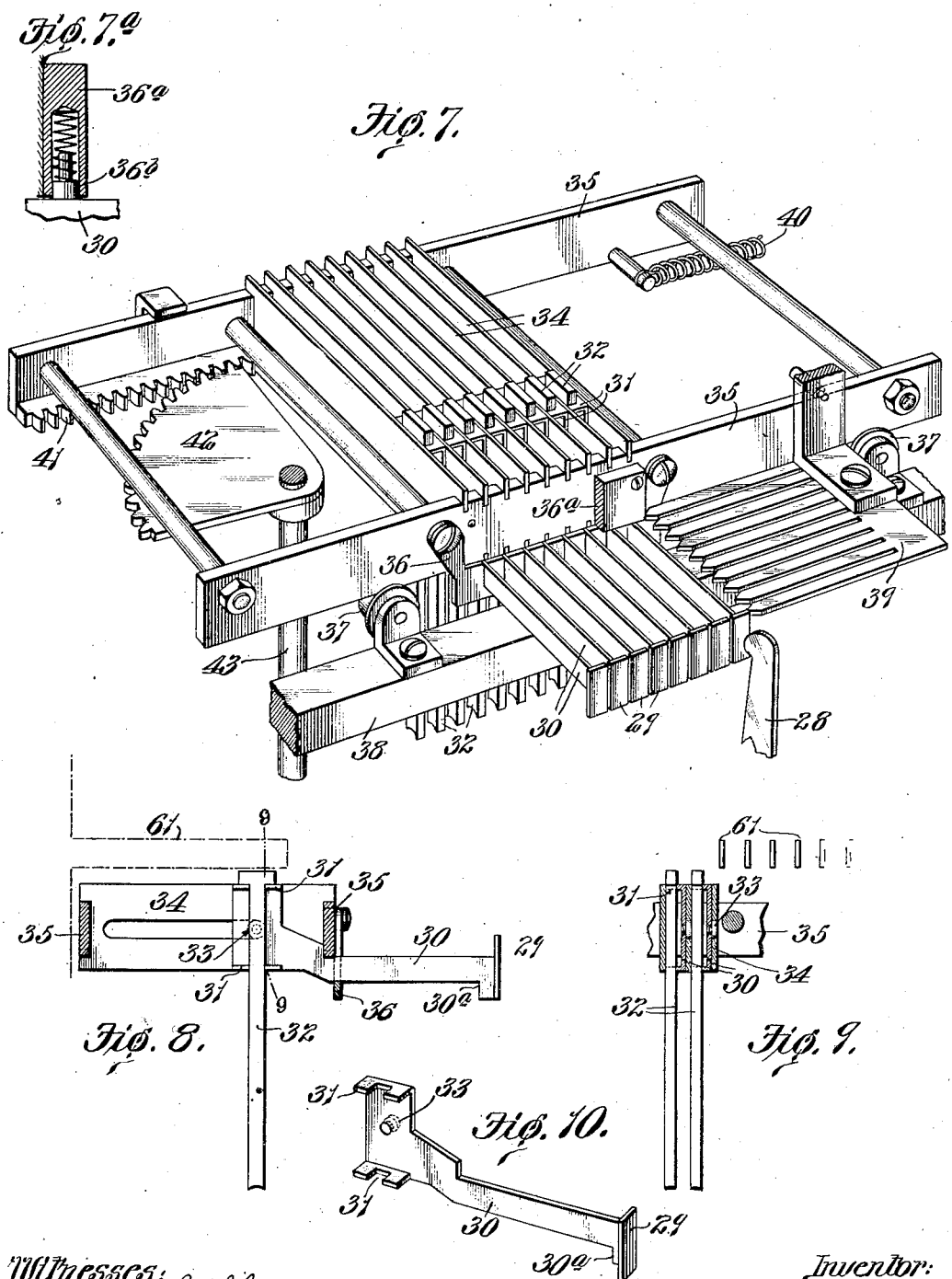

W. W. HOPKINS.
CALCULATING MACHINE.
APPLICATION FILED APR. 9, 1909.
1,070,034.
Patented Aug. 12, 1913.
12 SHEETS—SHEET 8.
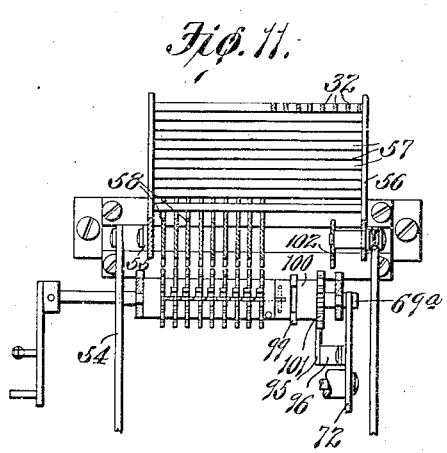
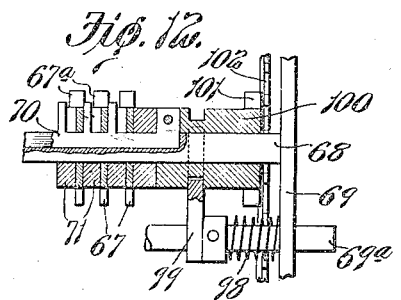
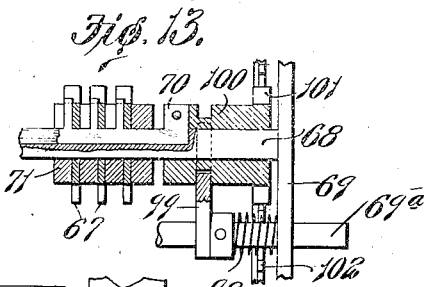
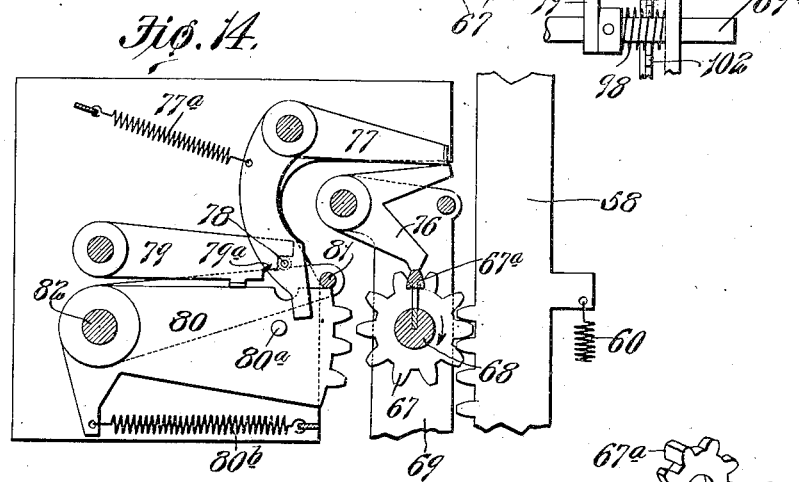
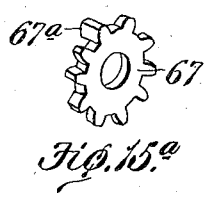
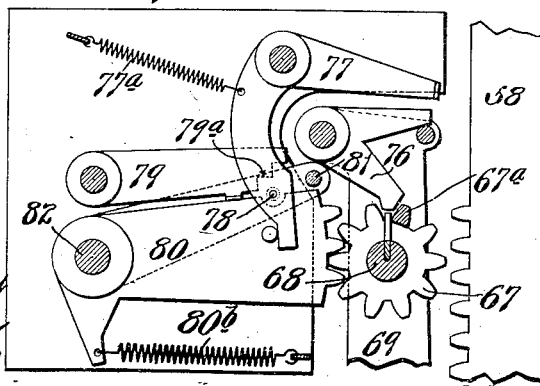
Inventor:
William W. Hopkins.

W. W. HOPKINS.
CALCULATING MACHINE.
APPLICATION FILED APR. 9, 1909.
1,070,034.
Patented Aug. 12, 1913.
12 SHEETS—SHEET 9.
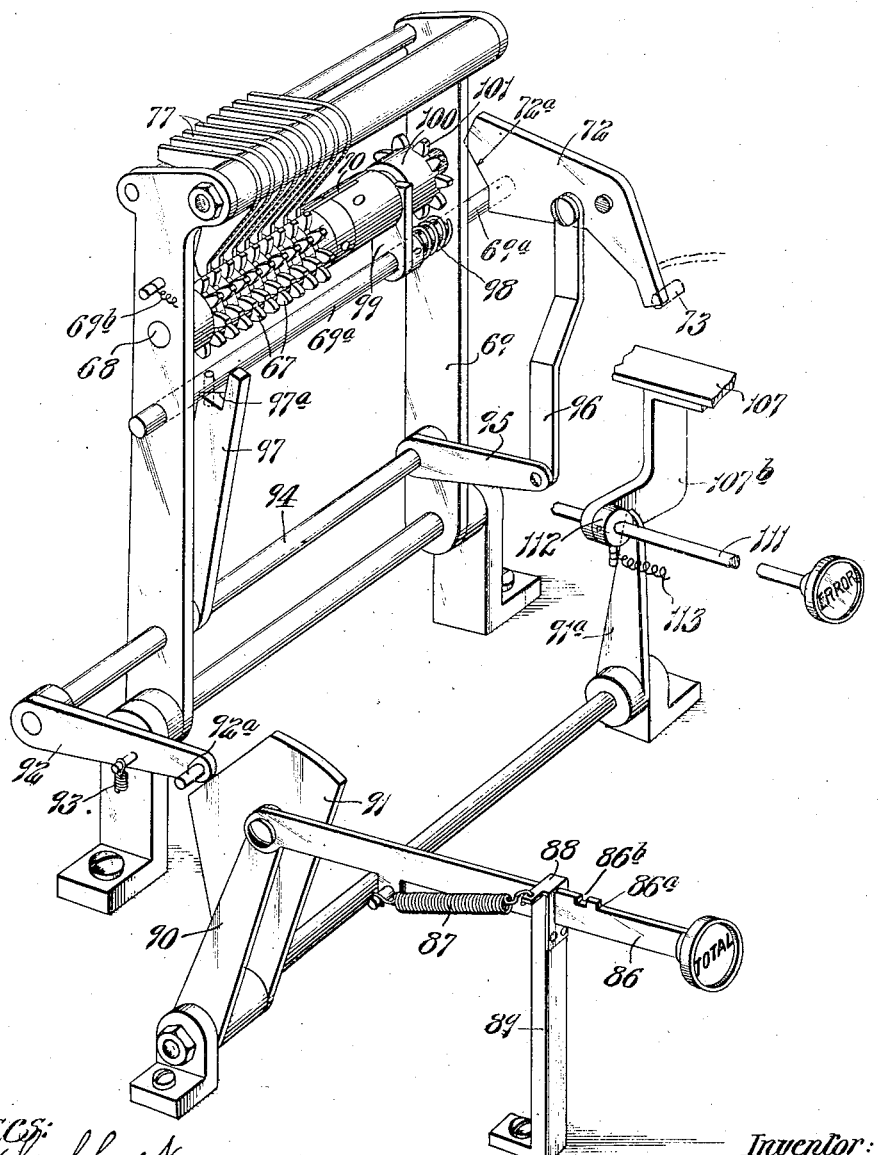

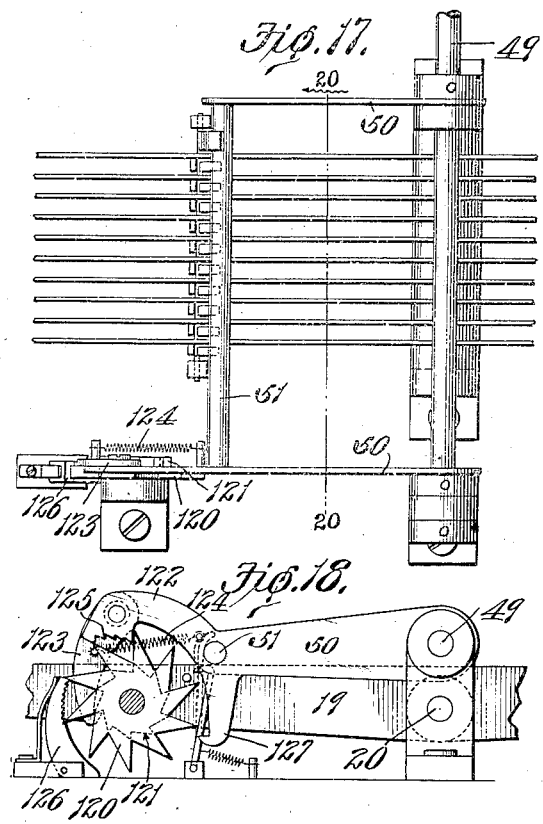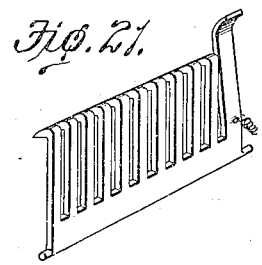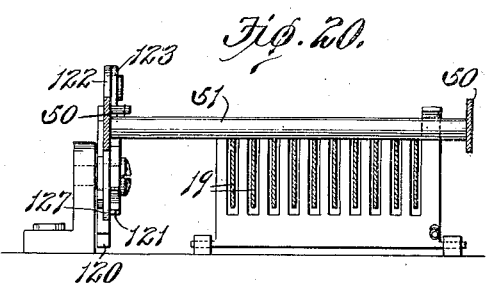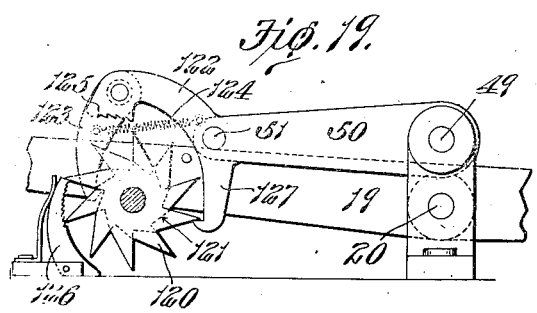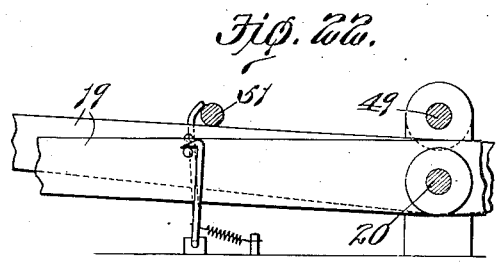

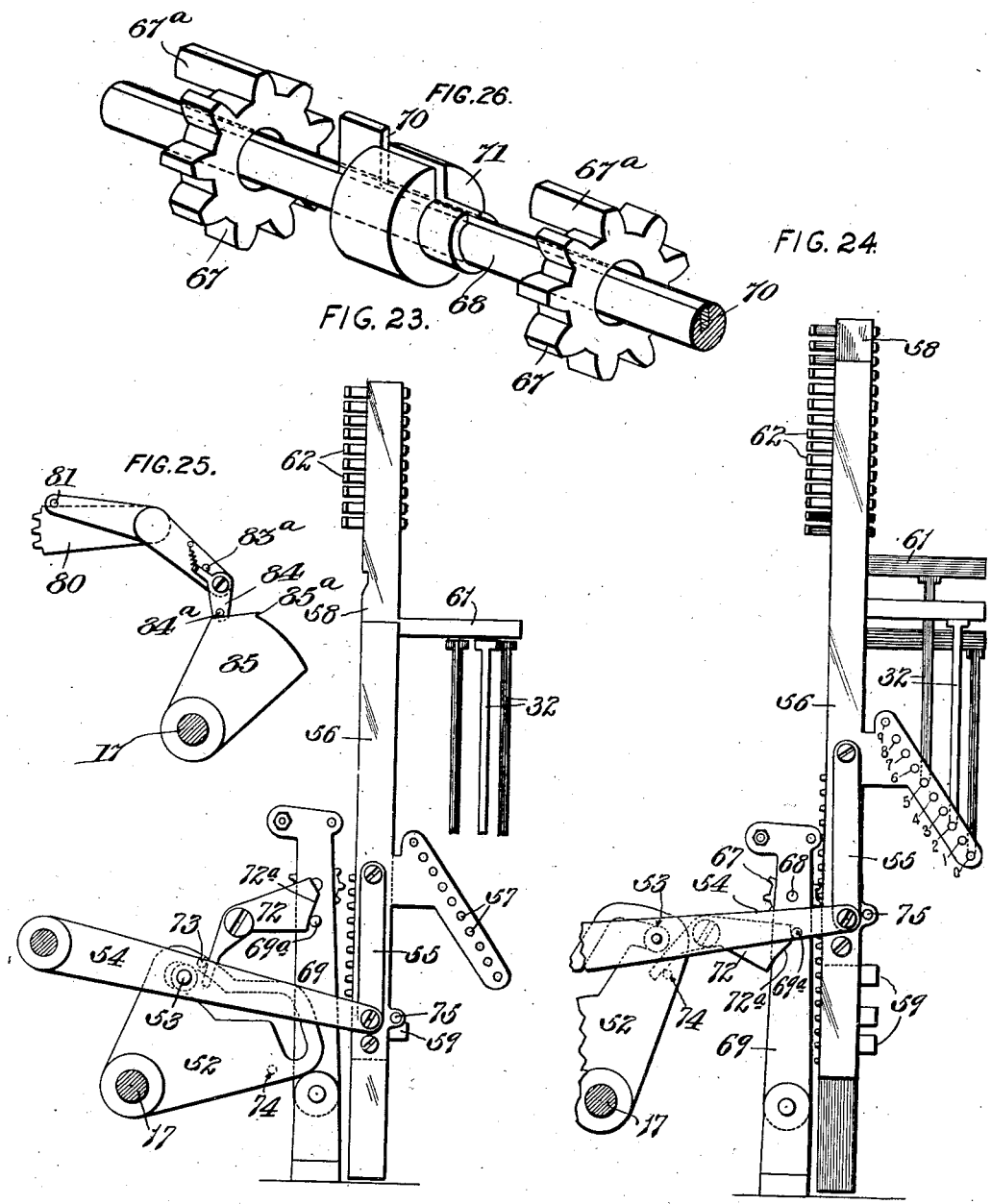

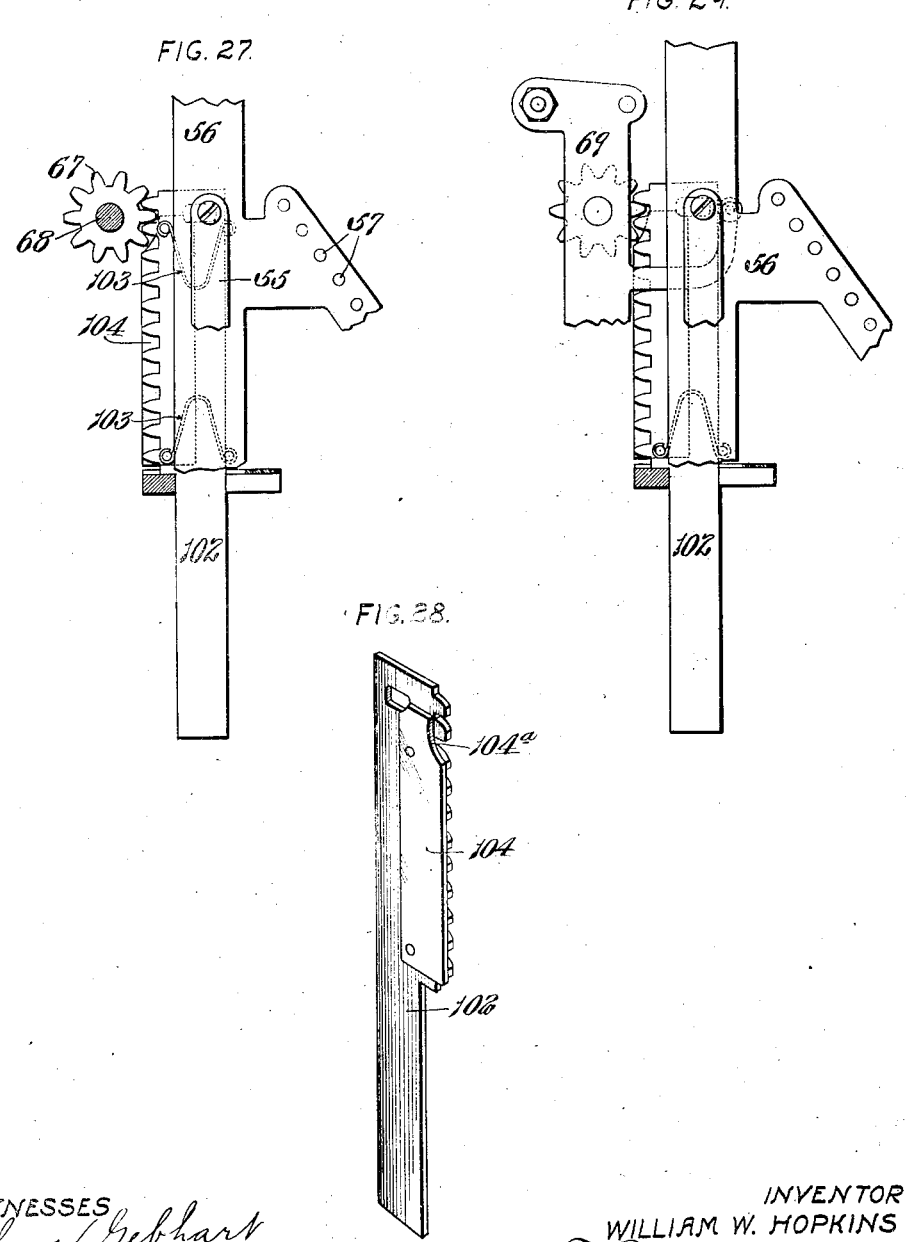

UNITED STATES PATENT OFFICE.

WILLIAM W. HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,070,034.

Specification of Letters Patent. Patented Aug. 12, 1913.

Application filed April 9, 1909. Serial No. 488,883.

*To all whom it may concern:*

Be it known that I, WILLIAM W. HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1:
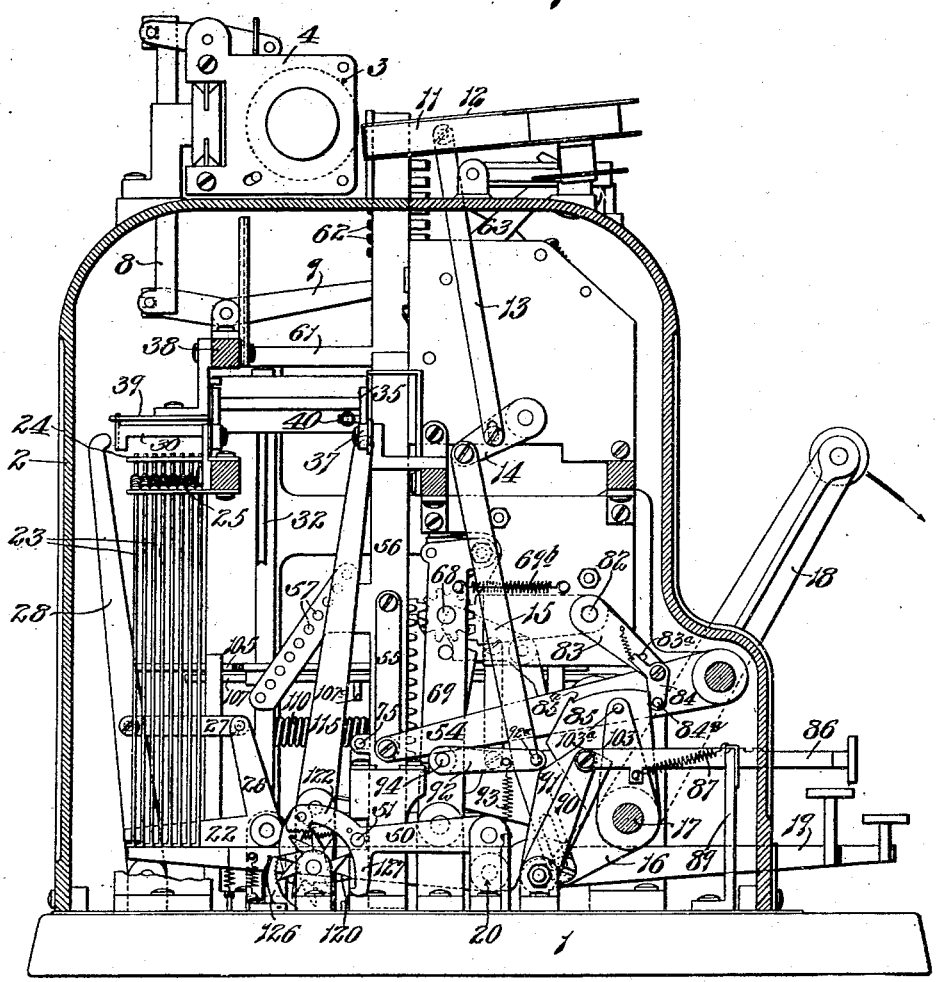
Figure 2:
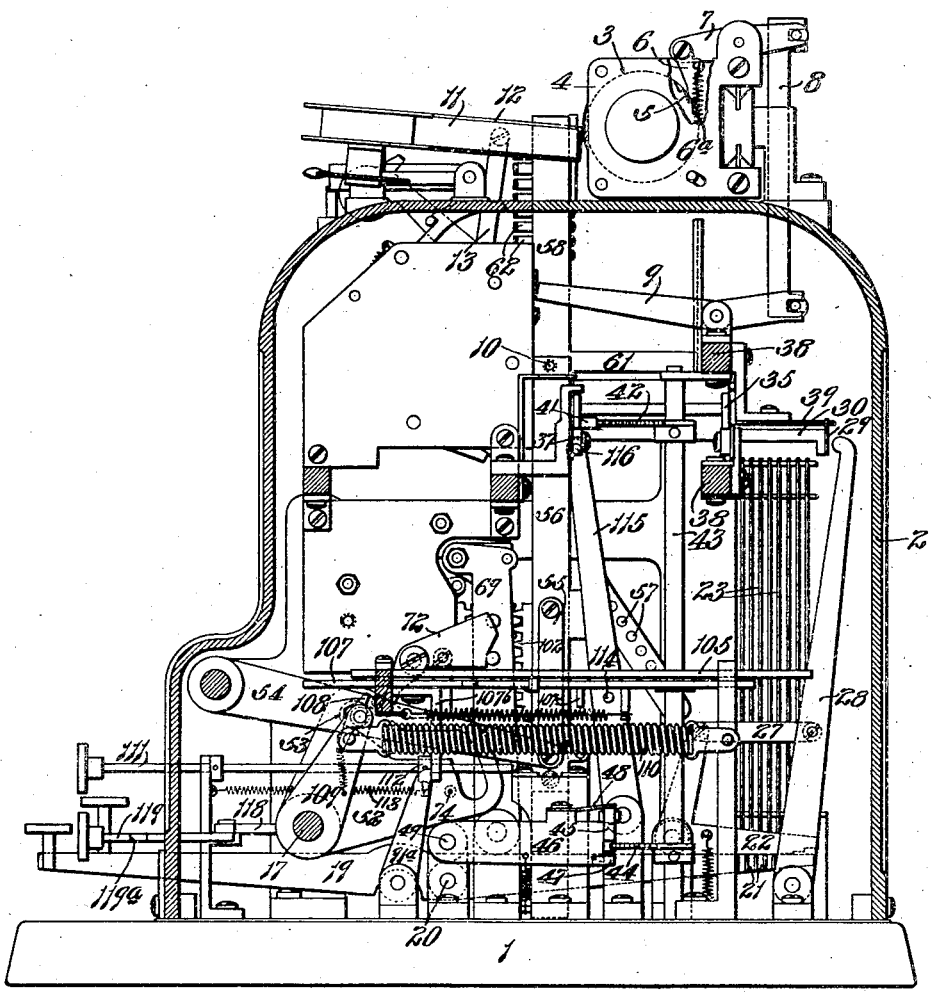
Figure 3:
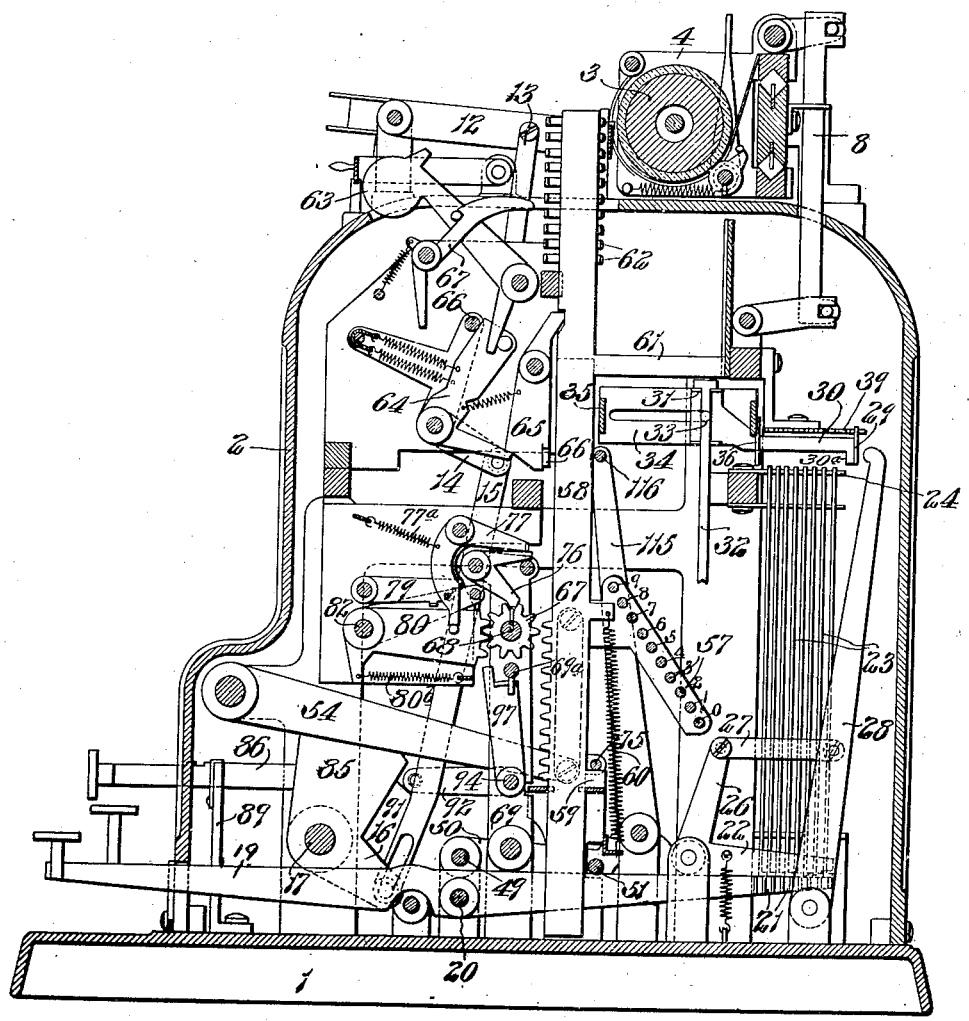
Figure 4:
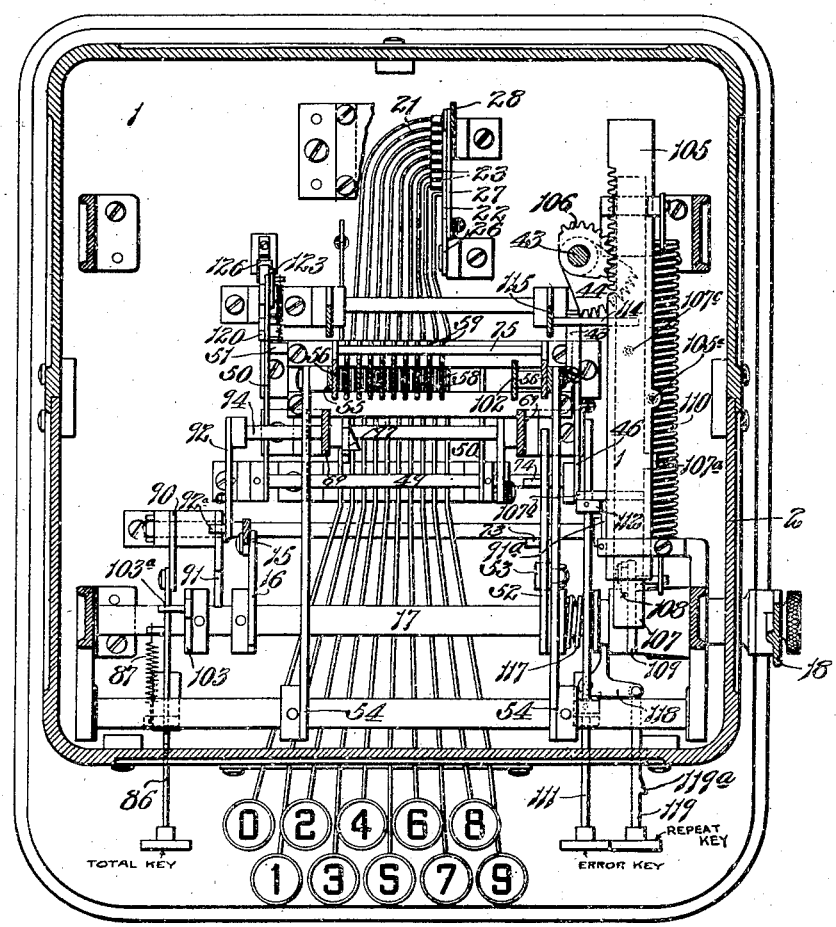
Figure 5:
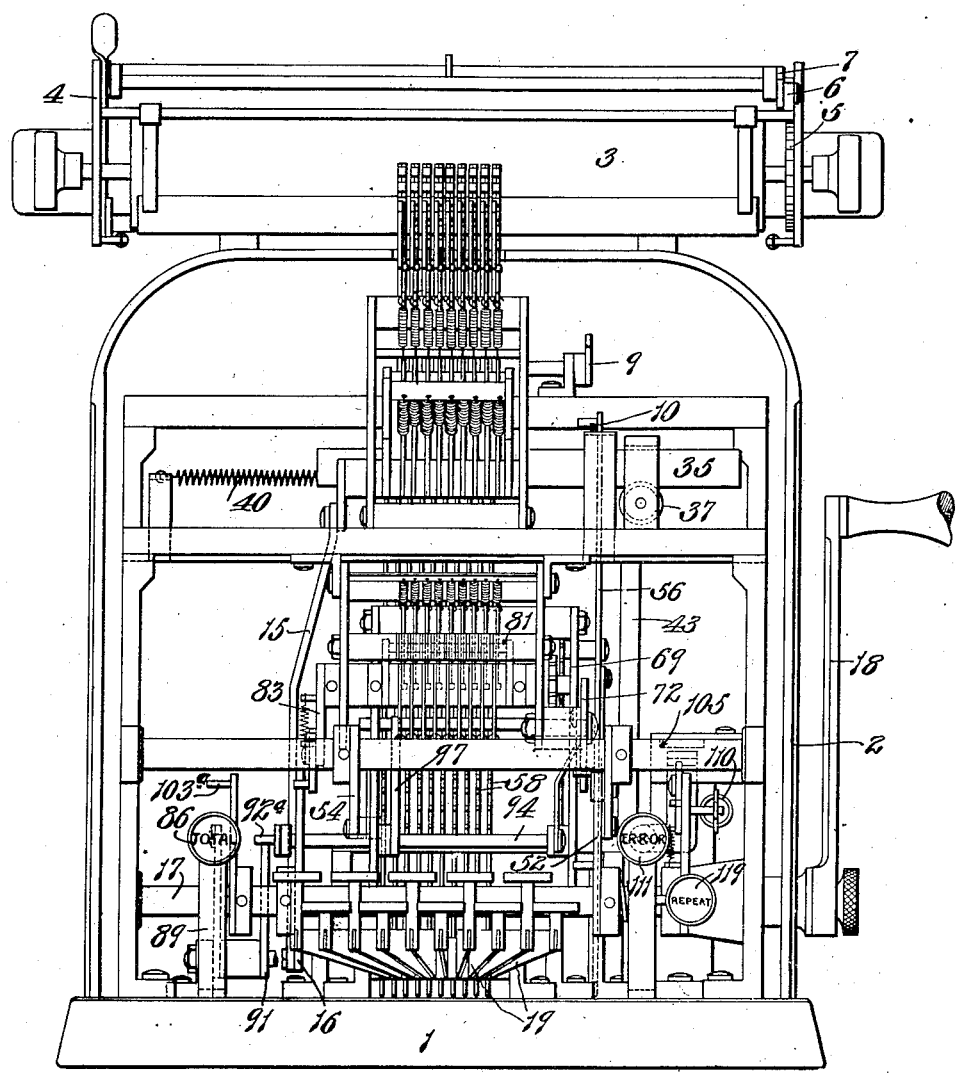
Figure 6:
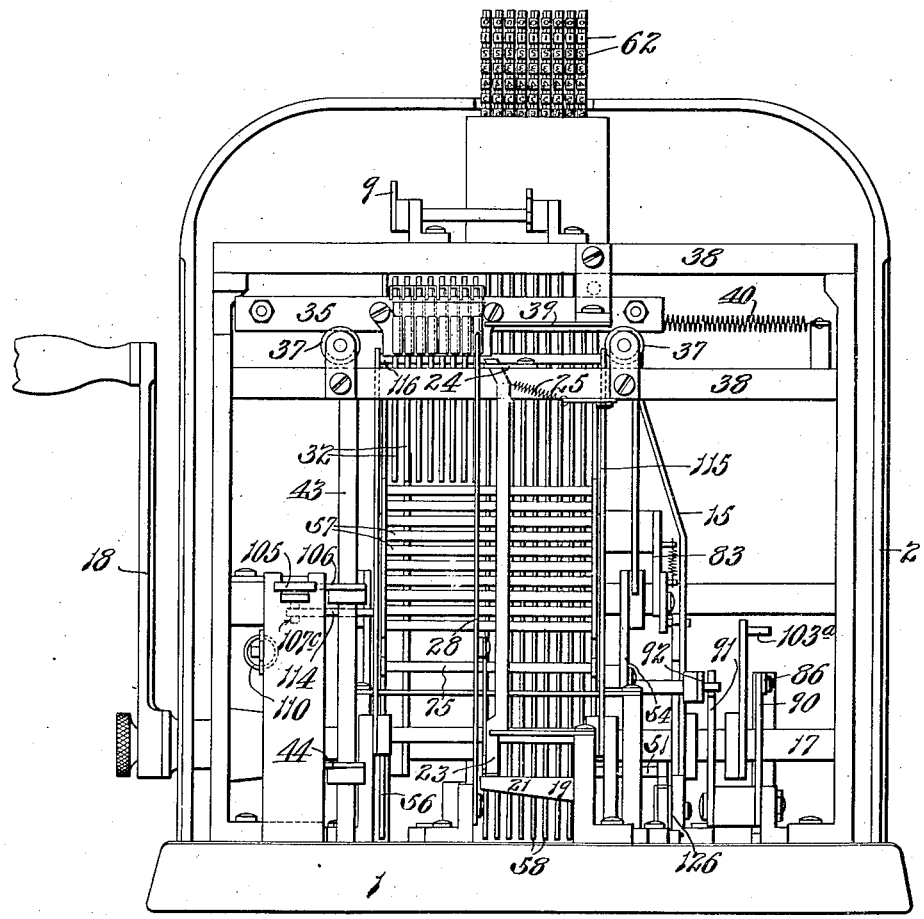

Figure 1 is a side elevational view of my improved calculating machine as seen from the left hand side, the casing being cut away to more clearly show the interior mechanism; Fig. 2 is a similar view as seen from the right hand side of the machine; Fig. 2ª is a detail view of the escapement mechanism, showing the same in a different position from that shown in Fig. 2; Figs. 2ᵇ and 2ᶜ are enlarged elevational views of said escapement mechanism in different positions; Fig. 3 is a vertical sectional view, approximately through the center of my improved machine; Fig. 4 is a horizontal sectional view through the machine, taken just above the plane of the key-bars; Fig. 5 is a front elevational view of my improved machine, the front portion of the casing being removed to more clearly show the interior; Fig. 6 is a rear elevational view of the machine, the rear portion of the casing being removed to show the interior; Fig. 7 is a detail view of the traveling carriage and its associate part; Fig. 7ª is a sectional view through the friction device which coöperates with the setting-up bars; Fig. 8 is a cross-sectional view through the carriage, showing a setting-up bar and its movable element in normal position; Fig. 9 is a sectional view on line 9—9, Fig. 8; Fig. 10 is a detail view of one of the setting-up bars; Fig. 11 is a horizontal sectional view through the racks in a plane just above the totalizer; Fig. 12 is a detail longitudinal sectional view through the totalizer; Fig. 13 is a similar view showing certain of the parts in a changed position; Fig. 14 is an enlarged detail view showing the carrying mechanism; Fig. 15 is a similar view showing the parts in a changed position; Fig. 15ª is a detail view of one of the totalizer wheels; Fig. 16 is a detail view of the totalizer key and its connections; Fig. 17 is a top plan view of the locking device for the key-bars, and the means for compelling a full stroke of the handle; Fig. 18 is a side elevational view of the mechanism for compelling a full stroke of the handle; Fig. 19 is a similar view showing the parts in a changed position; Fig. 20 is a sectional view on line 20—20, Fig. 17; Fig. 21 is a detail view of the locking plate; Fig. 22 is an elevational view showing the locking plate in an operative position; Fig. 23 is an elevational view showing movable elements carried by the setting-up bars interposed between the lifting frame and racks; Fig. 24 is a similar view showing the racks positioned and the totalizer in mesh therewith, for the purpose of introducing an item thereinto; Fig. 25 is a detail view illustrating part of the carrying mechanism; Fig. 26 is a conventional illustration, the elements being separated, of the zero-determining mechanism; Fig. 27 is a side elevational view of the means for operating the zero comb; Fig. 28 is a detail view of the movable rack; Fig. 29 illustrates a modified form of mechanism for coöperating with the rack.

This invention relates to a new and useful improvement in calculating machines, the object being to construct a device of the character described which will record numbers or items on a sheet of paper, registering the same in an accumulator or totalizer, whereby the total of said items may be obtained as a footing to the column of items recorded, said total being retained in the machine as a sub-total or the machine being cleared at the end of the total-taking operation.

With these objects in view, the invention consists in the construction and arrangement of the several parts, all as will hereinafter be described and afterward pointed out in the claims.

Prefatory to a detailed description of the machine illustrated in the accompanying drawings, I will state that the principle of operation involved therein, is, I believe, broadly new. Briefly, this novel principle of operation is as follows: Being a ten-key machine, the digits composing a number or item are successively struck on the keys as, for instance, in setting up the example 25, the 2 key would first be struck, then the 5 key. The operation of these keys causes stop-bars to be successively raised to act as temporary stops, which, in their lifted positions, arrest a selected setting-up bar moved or pushed into position contemporaneously by the operated key. The leverage between the operated key and the setting-up bar actuator increases as the value of the digit on the key increases, so that the setting-up bar under control of the key board at any given instant of time may be moved to any one of nine different positions, depending upon the key operated. Each setting-up bar carries a pendant or liftable element designed to coöperate with a stepped lifting device and also with a rack or totalizer actuator in its path. A traveling carriage moves the setting-up bars and their coöperating liftable elements from right to left, so as to successively bring the setting-up bars under control of the keyboard and place the positioned setting-up bars and their carried liftable devices in control of the racks. When an example, say, for instance, 25, is successively struck on the proper keys 2 and 5, the downward movement of the key sets up a bar stop to determine the movement of the setting-up bar and likewise moves said setting-up bar until it is arrested by the stop bar. Devices are employed to insure a full stroke of each key. On the upward movement of each key, the escapement mechanism operates to move the positioned setting-up bar leftwardly one step and lock it in its adjusted position. This leftward movement places the positioned liftable device carried by the setting-up bar in control of the rack in the units column, and places another setting-up bar under control of the keyboard. The operation of the next key positions this second setting-up bar, the forward movement of said key placing the second setting-up bar in control of the units rack bar and advancing the first operated setting-up bar one step leftwardly and placing it in control of the tens rack bar.

So far as I am aware, I am the first to employ liftable devices in variable control of the totalizer wheels, whereby said totalizer wheels are rotated different distances in the registration of digits.

In the drawings, 1 indicates a base plate on which is arranged a removable housing 2 for inclosing the mechanism of the calculating machine.

3 indicates a platen mounted in a carriage 4 slidingly arranged upon the casing 2.

5 is a ratchet wheel secured to one end of the platen for coöperating with a pawl 6 mounted on the end of a lever 7, said lever having a slot and pin connection with a bar 8, whose lower end is connected to a lever 9, said lever 9 being in the path of a pin 10 arranged on the frame, which is lifted at every operation of the handle or operation of the power shaft. Thus, whenever the handle is pulled forward, pawl 6 is lifted to take a new tooth, the rearward movement of the handle permitting pawl 6, under the impelling action of a spring $6^a$ connected therewith, to rotate the platen the distance of one line space.

11 indicates an inking ribbon which is mounted upon appropriate spools and fed at each handle stroke, said inking ribbon, where it passes between the printing type and platen, being carried by a frame 12 having an opening opposite the printing line, said frame being lifted at each handle stroke to place the ribbon in front of the printing line of type so as to make a printing impression upon the paper on the platen. As the handle approaches the rearward limit of its movement, the ribbon is depressed so as to expose the printed line, thus making what is known as a "visible writing machine". The means for vibrating frame 12 consists of a link 13 (see Fig. 1) which has a lost-motion connection with an arm 14 operated by a link 15 having a slot and pin connection with a rock arm 15 mounted on a main or a power shaft 17 upon which the operating handle 18 is mounted.

It is obvious that instead of a manually operable main or a power shaft, said main or a power shaft could be motor driven, in a manner well known to this art.

*The keys and their connections.*—The keyboard consists of nine digit keys and a zero key, whose heads are appropriately marked and whose bars 19 are pivoted at 20 (see Fig. 3). The rear ends of the key bars are bent laterally as at 21, the bent portions lying under a horizontal member 22 of a bell crank lever, whose lower edge may be stepped, if desired, so as to regulate the extent of the lifting movement thereof by the key bars, and to equalize the downward movement of the keys in the keyboard. It is obvious that the zero key does not extend under the member 22 because when this key is operated there are no parts to be moved, except the carriage, which is moved one step to the left. The 1 digit key is located near the outer end of the member 22, and the 9 digit key near its pivotal point, the other digit keys being intermediate these two extremes so that whenever a key is depressed the same amount of key movement will lift the member 22 varying distances; in this case to nine different positions.

23 indicates stop bars whose lower ends are supported upon the rear ends of the key bars 19, said stop bars being guided in their vertical movement by appropriate comb plates, and whose upper ends are deflected laterally, as shown in Fig. 6, so as to provide a beveled or cam edge where they pass through the upper guiding comb 24. Springs 25 are connected to these stop bars 23 to hold them in position against the guiding comb 24 and also to draw them downwardly, this yielding downward pressure on the stop bars operating through the guide bars to hold the keys in their elevated position. The other member 26 of the bell crank 22 is connected by a link 27 to a pivotally-mounted push-bar 28, whose upper end is rounded or knob-shaped so as to coöperate with the vertical plates 29 on the rear ends of the setting-up bars 30. These setting-up bars 30 are illustrated in detail in Fig. 10. The inner ends of the setting-up bars 30 are formed with lateral projections 31 constituting vertical guide ways for the rack-operating devices 32, which, in this case, are shown as liftable pendants, though, if the rack bars were horizontally disposed, these devices would be arranged to move horizontally. A pin or projection 33 is carried by the setting-up bar to ride in a guiding slot in plate 34, there being a series of these plates mounted between the side frames 35 of the laterally-movable carriage. The liftable devices 32 are provided with heads which are brought into controlling relation with the racks. There may be as many of these lifting devices 32 as there are racks in the machine, but in the drawings I have shown one extra rack, being the rack of highest order into which numbers may be carried. In addition to the guiding pins 33 the setting-up bars are mounted in a comb plate 36 secured to one of the side frames 35 of the laterally movable carriage, which comb plate acts as a guide as well as a support for the setting-up bars.

36ª is a spring housing secured to the side plate 35 and provided with a number of spring-pressed plungers 36ᵇ, there being a plunger for each setting-up bar for the purpose of providing sufficient friction to hold said bars in their different positions before they are locked in their adjusted positions by the locking comb 39.

The side frames 35 of the laterally movable carriage (see Figs. 1, 2, 6 and 7) are mounted upon rollers 37 arranged in suitable brackets secured to the fixed cross bars 38 of the framing. On one of these fixed cross bars is a slotted, comb-shaped locking plate 39, whose slots open toward the vertical plates 29 on the rear ends of the setting-up bars; the teeth of this comb are beveled so as to guide the vertical plates into the slots in the event that the setting-up bars are not exactly positioned by the push bar.

40 indicates a spring connected to the carriage for moving the same leftwardly.

41 is a rack on the carriage which meshes with a segment 42 mounted on a vertical shaft 43 on which shaft is arranged an escapement segment 44 (see Fig. 2), with which coöperates a spring-pressed escapement pawl 45 pivotally mounted on an arm 46, and a fixed escapement pawl 47 extending from said arm.

48 is a spring which coöperates with the pawl 45.

Arm 46 is mounted on a rock shaft 49, to which rock shaft is also fixed an arm 50 (see Figs. 17 to 22), which arm 50 carries a bar 51 extending over the key bars to the rear of the pivotal point of said key bars. Whenever a key bar is depressed, the shaft 49 is rocked, lifting the arm or plate 46 and thereby carrying the spring-pressed escapement pawl out of engagement with the teeth of the escapement segment 44 (see Fig. 2ª). The spring 48 now acts to move the escapement pawl into position to engage the next escapement tooth, as shown in Fig. 2ᶜ, during which time the fixed escapement tooth 47 is in engagement with a tooth of segment 44 to prevent the leftward movement of the carriage. When the key rises, the plate 46 is lowered, causing the tooth 45 to again coöperate with the segment 44 and as soon as said segment is released from the fixed tooth 47 the spring connected to the laterally movable carriage moves said carriage leftwardly, until the pawl 45 is brought up against the plate 46, as shown in Fig. 2ᵇ. Thus at each key operation, the carriage moves leftwardly step by step, the downward movement of the key placing the spring-pressed escapement pawl into position to permit said leftward movement, the rising of the key effecting said movement. Hence, during the depression of any key, the carriage is stationary and as the key rises and approaches the upper limit of its movement, the carriage moves one step to the left. Whenever a key is depressed it will elevate its complementary stop bar 23 and operate the push bar 26 the required distance to move the setting-up bar forward until the shoulder 30ª thereof comes in contact with the upper end of the stop-bar and said setting-up bar is thereby arrested. The elevation of any one of the stop bars into operative position causes their upper inclined ends to move to the right into position in front of the shoulder 30ª before said setting-up bar is arrested. With regard to the stop-bars identified with the higher digits, say from 4 to 9, there is plenty of time for said bars to be elevated before the push bar moves the shoulder of the setting up bar into contact therewith. With regard to the stop bars identified with the lower digits, such as 1, 2 and 3, I prefer to notch or cut away the member 22 on the bell crank lever, so as to permit an initial movement of the stop-bars 26 before the push bar is operated. This gives the stop-bars time to get into position before the shoulders 30ª are moved thereagainst.

The purpose of inclining the upper ends of the stop-bars 23 is to have said bars, when they are raised, to move laterally into the paths of the shoulders 30ª on the rear ends of the setting-up bars. When the stop-bars 23 are in their normal or lowered position, they permit the push-bar 26 to move freely past their inclined ends. When, however, one of the stop-bars 23 is raised, its inclined end moves the upper end of said bar laterally in front of the shoulder 30ª of the setting-up bar, so that when the push-bar 26 positions the setting-up bar, said setting-up bar will be arrested by the end of the elevated stop-bar.

The operation of setting up an example in the setting-up devices, by positioning the lifting bars or pendants 32, is obvious from the above description. For illustrative purposes, we will assume that the 2 and the 5 keys have been successively struck to introduce the example 25 into the setting-up devices, the lifting bars 32 being moved into controlling relation to the tens and units rack bars. The traveling carriage normally stands one space or step to the right of the units rack bar and the operation of the two keys has caused the escapement mechanism to step the carriage two spaces leftward so that the first and second pendants 32 at the lefthand side of the carriage are in coöperative relation to the tens and units racks.

*Introducing an item into the totalizer.*—When the operating handle 18 is pulled, or what would be equivalent in this art, rocking the power shaft 17 where a motor drive was employed, the item set up in the setting-up devices will be introduced into the totalizer. The rocking of the power shaft 17 will effect the following: A plate 52 fixed on the shaft 17 will, through its cam slot engaging a roller 53 on an arm 54, of which there are two, one on each side of the machine, lift, by means of links 55, frame plates 56 so mounted as to move them vertically. These frame plates 56 carry rearward extensions in which are arranged bars 57, said bars constituting an inclined series, and being the equivalent of shoulders or stops, and whose function is to lift such of the pendants 32 as may be positioned thereover. These bars 57 represent the value of the movement communicated to the pendants 32. The uppermost bar, when lifting a pendant placed thereover, moving said pendant vertically a distance equal to nine teeth on the actuating rack; the next lowest bar, eight teeth, etc., down to next to the lowermost bar which lifts the pendants a distance equal only to one tooth. The bottom or zero bar may be omitted entirely as it has no lifting function with respect to the pendants 32 except, in the printing operation, lost motion may be taken up and the zero type properly positioned in the printing line.

58 are vertically movable bars constituting actuating racks for the totalizer. These bars are mounted in suitable guide ways and supported in position by shoulders 59. A spring 60 connected to each bar tends to hold them in their lowered position. A rearwardly extending arm 61 coöperates with lifting bars 32. Printing type 62 are carried by the upper ends of the bars for making a printing impression upon the paper carried by the platen 3. The uppermost type is the zero type. These zero type normally lie in the printing line. If desired, the zero type could be arranged below the printing line so that more space would be provided for visible writing. Where the type are dropped below the printing line, the zero lifting bar 57 would be brought into play at each handle pull. Type hammers 63 coöperate with the type in the printing line, said type hammers being impelled by spring actuated arms 64, normally held restrained by pawls 65 which are under control of the bars 58. A restoring bar 66 coöperates with the spring impelled arm 64, said restoring bar, when the handle is pulled forward, coöperating with the tail-pieces or hooked pawls 67 which restrain the type hammers from movement, notwithstanding that the arms 64 have been previously released by the forward movement of its complementary bar 58. I do not, in this application, claim this type hammer mechanism, as the same is illustrated and described in Belgian Patent No. 202,081, dated August 21, 1907. I would state, however, that the restraining pawls 65 are each provided with overlapping bent portions 66 whereby the zeros to the right of any denomination are automatically printed. The pawls 65 are held in position by appropriate springs connected thereto, as shown in Fig. 3. Bars 58 are provided with rack teeth near their lower ends, as shown in Fig. 3. These rack teeth may be formed integral with the bar, or a separate rack can be mounted on the bar. These rack teeth are designed to mesh with adding wheels 67 mounted on a shaft 68, which shaft has its bearings in frame 69 pivoted at its lower end to suitable brackets extending up from the base plate 1.

The construction of the totalizer is best illustrated in Figs. 11 to 15 inclusive, wherein it will be seen that shaft 68 is provided with a longitudinal groove in which is mounted a comb plate 70. The part of said plate which corresponds to the back of the comb is located within the grooves in the shaft, while the teeth of the comb extend beyond the shaft and, normally, between the totalizer wheels 67. Each totalizer wheel is provided with a lateral projection or shoulder in the nature of a pin, or as shown in Fig. 15ª, one of the teeth of the wheel may be extended laterally toward the left looking from in front of the machine, so as to make one wide tooth 67ª on the wheel. 71 indicates slotted washers strung on shaft 68 between the wheels 67 and through the slots of which extend the teeth of comb 70, said teeth projecting beyond the washers so as to engage the wide teeth 67ª, picking up said wide teeth and rotating the wheels to zero position in total taking operations. Normally, the teeth of comb 70 lie in a neutral position, permitting teeth 67ª, which may be termed the zero teeth, to pass without interruption, as shown in Fig. 12. This comb plate 70 is thus normally inoperative with respect to the totalizer wheels in the ordinary operations of introducing items into the totalizer, the wheels being free to rotate. The wheels 67 are normally out of mesh with their actuating racks and on the forward stroke of the handle the racks are lifted by the pendants 32 lying under the extension 61. When the racks are supported in their elevated position by said pendants, said pendants in turn resting upon the step-bars 57 of the lifting frame, means are provided to swing the frame 69 and move the wheels 67 into mesh with the racks. This means consists of a bell crank 72 mounted upon the side frame plate containing the carrying mechanism (see Fig. 2), which bell crank lever, as shown in Fig. 16, is provided with a cam face 72ª at its end for coöperating with a lateral projection 69ª on the frame 69. In the machine shown in the drawings, this lateral projection 69ª happens to be the end of a shaft. The forward end of bell crank lever 72 coöperates with a pin 73 on the cam plate 52 (see Fig. 23), which pin, when the handle is pulled forward, rocks the bell crank lever as the handle approaches the limit of its forward movement, moving the totalizer wheels into mesh with their racks. Another pin 74 is mounted on the plate 52, which pin 74 coöperates with the bell crank lever to lift the same and permit the frame 69 to swing forwardly under the impelling action of its spring 69ᵇ (see Fig. 16), the other end of which spring is connected with the housing containing the carrying mechanism. In this manner, the wheels 67 are thrown into mesh with the racks when said racks are elevated and the handle is at the forward limit of its movement, the rearward movement of the handle depressing the racks and actuating the totalizer wheels, said totalizer wheels, as the handle approaches the limit of its rearward movement, being thrown out of mesh with the racks, when the pin 74 operates the lever 72. The springs 60 tend to pull the racks downward and may effect the actuation of the totalizer wheels, but these springs are not relied upon wholly for this purpose, as a restoring bar 75 arranged back of the bars 58 coöperates with the lug or shoulder 59. This restoring bar 75 is carried by the lifting frame 56. Frame 56, at every handle pull, must make a full movement comprehending the nine different positions of the racks, and in its downward sweep will positively restore the racks. Frame 56 thus not only positively lifts the racks to their intended position, but when the racks are lifted, will move them to their home position if the springs 60 have not already done so. The purpose of the springs 60 is, therefore, to prevent an overthrow upward movement of the racks except in the case of the "9" bar 57, which, when it coöperates with a pendant 32, practically locks the rack to the frame 56 so that no overthrow movement is possible.

*The carrying mechanism.*—The zero tooth 67ª is utilized as a tripping projection to effect the carrying from a totalizer wheel to the next adjacent totalizer wheel of higher order. Referring to Fig. 14, the totalizer wheel rotates in the direction of the arrow in addative operations. When the zero tooth 67ª makes a complete revolution from its starting or zero position, it will, in passing from the 9th to the zero position, operate a tripping pawl 76, which tripping pawl coöperates with the bell crank lever 77 provided with a pin 78, which pin normally rests under a shoulder 79ª of a stop-bar 79. When the parts are in the position shown in Fig. 14, pin 78 has been moved rearwardly past the shoulder 79ª permitting the bar 79 to drop so as to hold the bell crank lever 77 in such abnormal position and against the energy of its restoring spring 77ª. In this abnormal position of the bell crank lever 77, its lower end has been moved out of the path of a pin 80ª on a toothed segmental lever 80, connected to an impelling spring 80ᵇ.

81 indicates a restoring bar operating upon the upper edges of the segments 80, said bar normally holding said segments depressed even when they are released after the pawls have been tripped. If the pawl 76 is operated when the wheels 67 are in mesh with their actuating racks then the bar 81 prevents the toothed segments 80 from rising. As the handle approaches its home position, the wheels 67 are disengaged from their racks and thrown into mesh with the toothed segments 80. The final rearward movement of the handle operates the bar 81 so as to release the segments 80 and effect the carrying. Thus the totalizer stands fully carried when the handle is in its home position and a total can be taken therefrom, without necessitating an extra handle pull.

The means whereby the restoring bar 81 is operated are as follows: 82 is a shaft on which the segments 80 are loosely mounted. Fixed to shaft 82 are the arms which support the restoring bar 81. On the end of shaft 82 (see Fig. 1) is an arm 83 carrying a tappet 84 at its end, said tappet having a pin 84$^a$ which coöperates with a plate 85 fixed to the shaft 17. In the position of the parts shown in Fig. 1, the handle 18 is home. As the handle starts forwardly from the position shown in Fig. 1, the tappet 84 will be idly vibrated, said tappet riding over the edge of the plate 85 and over a small shoulder 85$^a$ near the rear edge of plate 85. During this forward movement of the handle, the racks are being elevated and the wheels 67 are not in mesh therewith. As the handle approaches the forward limit of its movement, the tappet 84 straightens to a radial position under the impelling action of its spring acting behind the shoulder 85$^a$. As the handle starts rearwardly (see Fig. 1), the bar 81 is depressed, restoring all of the segmental plates 80 and the pawls 77 and associate parts, which have been standing in a tripped position, the shoulder 85$^a$ giving the necessary excess movement to the parts to insure their reaching their home position. Of course, in the rearward movement of the handle, the tappet will not yield, but by coöperating with the pin 83$^a$, will act practically as the rigid part of the arm 83. As the handle reaches the rearward limit of its movement, the final movement of the handle permits the pin 84$^a$ to drop in front of the plate 85, causing the bar 81 to rise, and with said bar the springs 80$^a$ will raise all of the segments 80 which have been tripped. The wheels 67 having previously been thrown out of mesh with their actuating racks and into mesh with the teeth on the segments 80, will be rotated the distance of one tooth by such segments as are permitted to rise in the carrying operation.

*Taking a total.*—86 represents a total key which, in the accompanying drawings, is illustrated as a push bar although, of course, it can be represented as a depressible key by the use of a bell crank connection to the part that it operates. This total key 86 is held in its outward position by means of a spring 87 connected thereto and tending to lift the key upwardly so that a shoulder 86$^a$ can be brought into contact with the upper end of a keeper plate 88 mounted on a supporting post 89 (see Fig. 16). When the total key 86 is pushed in, it is held in its adjusted position by the shoulder 86$^a$. To release the total key it is necessary only to depress it to permit its outward movement. This total key has a notch 86$^b$ behind the shoulder 86$^a$ for purposes which will hereinafter be described. The inner end of the total key is connected to a rock arm 90 mounted on a rock shaft and conjoined to a cam plate 91. This cam plate coöperates with a pin or lateral projection 92$^a$ on the end of a rock arm 92 which is held in its depressed position by means of a spring 93.

94 is a rock shaft to which the arm 92 is connected, said rock shaft having an arm 95 on its opposite end. A link 96 is connected to the plate 72. In this manner, whenever the plate 72 is vibrated by the pin 73 to move the totalizers into and out of mesh with the racks, the parts just described may be idly vibrated as the pin 92$^a$ may be depressed by swinging in an arc of a circle behind the plate 91. When, however, the total key is pushed in, the plate 91 engages the pin 92$^a$ and lifts the plate 72 so as to move the same upwardly out of engagement with the lateral projection 69$^a$ on the swinging frame 67. The purpose of this is to prevent the pins 73 and 74 from operating the plate 72 and interfering with the total-taking operation.

Means are provided for causing the totalizer wheels to be thrown into mesh with the racks when the total key is pushed in, this means consisting of an arm 97 on a shaft 94 which arm is provided at its upper end with a lateral cam face 97$^a$ for laterally moving the shaft 69$^a$, whose end constitutes the projection for coöperating with the plate 72. Thus, when the total key is pushed in, shaft 69$^a$ is moved laterally by the cam face 97$^a$, the upper end of arm 97 engaging said shaft so as to move the totalizer wheels into mesh with the racks, said wheels being held in mesh with the racks by the periphery of plate 91 which is positioned under the pin 92$^a$. Thus the shoulder 86$^a$ is not entirely relied upon, on account of its coöperation with the keeper plate 88, to hold the totalizer wheels into mesh with the racks.

The longitudinally displaced shaft 69$^a$ is held in its normal position by means of a spring 98, said shaft carrying an arm 99 which fits in an annular groove in a sleeve 100 slidingly mounted on the shaft 68, and to which sleeve the comb plate 70 is secured. The sleeve 100 is conjoined to a gear, or is provided with gear teeth 101 which are designed, when the total key is operated, to be moved into engagement with the rack teeth 102 on the lifting frame 56. Thus, when the total key is operated, the plate 72 is rendered inoperative, the gear 101 is thrown into mesh with the rack on the lifting arm and the comb plate 70 is moved so as to bring the teeth thereof into coöperative relation to the zero teeth 67$^a$ on the totalizer wheels (see Fig. 13). When the power shaft 17 is operated under the above conditions, the frame 56 is lifted as in the ordinary operations of the machine, the lifting of said frame transmitting motion through the gear 101 to the shaft 68. The teeth of the comb will, of course, be rotated with the shaft until they pick up the zero teeth 67$^a$ of the totalizer wheels respectively, whereupon the racks will be lifted upwardly a distance equal to the number indicated by the position of the wheel. For instance, if the number 25 had been registered in the totalizer, or a series of numbers equaling 25 had been successively registered therein, and it was desired to take the total thereof, the total key would be pressed inwardly and the handle pulled. As the tens and units racks are the only two to be operated, it follows that as all of the other racks stand at zero, the rotation of the shaft 68 in a direction reverse to the addative movement of the wheels 67 cannot affect any of the racks to the left of the tens rack, because the comb teeth identified therewith will sweep idly around and come to a position of rest on the opposite side of the tooth 67$^a$. With respect to the tens and units totalizer wheels, however, the comb teeth coöperating therewith will sweep around, in the first instance, a distance equal to eight teeth before it will pick up the tooth 67$^a$. By engaging the tooth 67$^a$ and the tens wheel and carrying said wheel with it the remainder of the movement equal to two teeth, the tens rack will be lifted a distance of two teeth and the type positioned to print accordingly. The comb tooth identified with the units totalizer wheel will idly sweep a distance of five teeth before it picks up the zero tooth 67$^a$ and moves the units rack upwardly a distance of five teeth, positioning the five type in the printing line. As the handle approaches the forward limit of its movement, the bar 66 of the type hammer mechanism will release all of the hooked pawls 67, but as the units and tens rack bars only have been lifted, their respective pawls only have released the pawls 64 and consequently the type hammers identified with the units and tens columns only will be released to make a printing impression.

It will be noted from the above description that the pendants 32, which lift the rack bars in introducing items into the totalizer, remain in their zero position and cannot possibly interfere in the total-taking operations. In the event, however, that an example is set up in the setting up devices and the total key is pushed in to take a total before said example is introduced into the totalizer, I provide means for restoring the pendants 32 and the carriage so that they will not in any way interfere with the total-taking operations. This means is the same which is operated by the error key hereinafter described, and consists in an arm 91$^a$ (see Fig. 16) fixed to the shaft on which the plate 91 is mounted, said arm 91$^a$ coöperating with a bracket 107$^a$ on the restoring bar 107, whereby when the total key is pushed inwardly the restoring bar is also moved inwardly, which restores the carriage and moves the pendants 32 out of the way of the lifting pins 57. This connection between the total key and the restoring bar does not in any way prevent the independent operation of the restoring bar, but on the contrary the restoring bar can be pushed inwardly in the performance of its function by the handle, and also by the error key.

The means for restoring the total key consists of an arm 103 on the shaft 17, whose pin 103$^a$ coöperates with the notch 86$^b$ in the total key bar 86. When the handle approaches the limit of its forward movement, this pin 103$^a$ depresses the shank of the total key so as to release the shoulder 86$^a$ and permit the total key to move outwardly slightly, to prevent a reëngagement between the shoulder 86$^a$ and its coöperating keeper plate. The pin 103$^a$ being in the notch 86$^b$ is thus relied upon to hold the total key in its inner position, during which time the printing is effected. As the handle starts on its rearward movement, the pin 103$^a$ is lifted out of the notch 86$^b$ and the total key and its parts are restored to their normal position (the notch 86$^b$ being narrower than the keeper plate 88, will not catch thereon), which insures the totalizer standing at zero, the machine being cleared under the conditions. If it is desired to retain the total in the machine, the total key is held in its inner position until the handle reaches the rearward limit of its movement. To add to the sub-total thus preserved in the machine, it is necessary to move the total key outwardly and this can be done by manually depressing the total key 86, permitting the spring 87 to act in restoring the total key and its associate parts to normal position.

In the total-taking operation, when the total key is released so as to clear the machine when the handle is at the forward limit of its movement, the comb 70 stands on the wrong side of the zero teeth 67$^a$, and have to be restored to their normal position. When, however, the total is retained in the machine, the comb teeth are revolved reversely so as to permit the racks to be lowered their full limit, in which position the totalizer wheels stand as they did prior to the meshing of the racks therewith in the total-taking operation, which is their normal (and proper) position. Of course, if the comb 70 made a complete revolution there would be no necessity for restoring the comb after the machine was cleared, but as said comb makes only nine-tenths of a revolution and lies on the wrong side of the teeth 67$^a$ when the machine is cleared, means are provided to move said comb back to its normal position and these means consist in connecting a rack 102 to springs 103, said springs being connected to the frame 56. (See Fig. 27.) These springs exert pressure at top and bottom to hold the rack projected forwardly and in position at all times to mesh with the gear teeth 101. Rack 102 is guided on the lifting frame 56 by slot and pin connections. A plate 104 is carried by the rack 102 and is located to the left of said rack, as seen from the front of the machine. This plate is cut away at its upper end at 104ª for the following purposes: The plate 104, being flush with, or slightly in advance of the teeth of rack 102, will, when the gear 101 is shifted, and the lifting frame is moved rearwardly in the total-taking operations, engage the teeth of gear 101. As the frame is lifted, the rack 102 will rotate gear 101 and its connected comb plate 70. When the total key moves forward to clear the machine when the rack 102 is elevated, the frame 69 and its carried totalizer wheels 67 are moved forwardly to disengage the latter from the racks 58, the springs 103 maintain engagement between the rack 102 and gear 101, and notwithstanding the forward movement of the arm 97, the plate 104, engaging the side edges of the teeth of gear 101, will prevent said gear from moving longitudinally the shaft 68. Consequently, the gear 101 and rack 102 continue in mesh as the frame 56 is lowered, and the comb teeth are reversely rotated to the proper position behind the zero teeth 67ª, that is, behind said teeth with respect to their movement in addative operations. When the lifting frame reaches the limit of its downward movement, the cut-away portion 104ª will permit the gear 101, its conjoined comb plate, and shaft 69ª, to move leftwardly. In this leftward position, frame 56 can be repeatedly lifted in the ordinary operation of the machine without rotating the gear 101. When, however, the total key is operated and the gear 101 moved laterally into mesh with the rack 102, the springs 103 will permit said rack 102 to yield rearwardly when the frame 69 is swung rearwardly to engage the totalizer wheels with the racks in the total taking operation. Thus it will be seen that irrespective of the disengagement between the totalizer wheels and the racks when the racks are raised, and the totalizer wheels stand cleared, the pinion 101 and the rack 102 remain in mesh during the downward movement of frame 56 to restore the comb plate and place the comb on the proper side of the teeth 67ª. When the total is retained in the machine and the racks and totalizer wheels continue in engagement during the downward movement of the lifting frame, it is, of course, obvious that the special devices before described for reversely rotating pinion 101 to restore the comb to the proper side of the zero teeth are superfluous.

*Restoring the traveling carriage.*—The traveling carriage which supports the setting-up bars and lifting pendants 32 is, as before described, stepped leftwardly in setting up an example in the machine. When the handle is pulled to introduce an item into the totalizer wheels, means must be provided at the end of said handle pull to restore the traveling carriage and this means consists of a rack 105 (see Figs. 2 and 4), which meshes with a gear segments 106 on the shaft 43, which shaft carries the segmental gear 42 in mesh with the carriage rack 41. When the rack 105, which is mounted in suitable guide ways, is pushed rearwardly, the carriage is restored. The means for pushing the rack 105 rearwardly consists of a bar 107 which coöperates with a tappet 108 on the end of an arm 109 mounted on the shaft 17. To this arm 109 is secured a spring 110 which acts to pull the handle rearwardly and restore the parts to normal position. When the handle is pulled forwardly to lift the racks, the tappet 108 is positioned in front of the bar 107 and when the handle starts rearwardly, said bar 107 will be picked up and pushed rearwardly until a shoulder 107ª coöperates with a pin 105ª on the rack 105 and pushes said rack rearwardly. The reason for providing this lost motion between the pin 105ª and shoulder 107ª is to permit the rack 105 to move forwardly as the carriage is stepped leftwardly, without interfering with the position of any other parts in the machine. This enables me to give to the bar 107 an equal stroke at each handle pull, which equal stroke is sufficient to restore the rack 105 irrespective of whether said rack has been moved forwardly the distance of one, two or more teeth, as the case may be.

*The error key.*—This error key is illustrated in Fig. 4, and consists of a bar 111 having a collar 112 to which is connected a spring 113 for holding said error key forwardly. This error key is mounted in suitable guides. A bracket 107ᵇ extends from the bar 107 and surrounds the error key behind the collar 112. The bar 107 may thus be operated without disturbing the position of the error key. When, however, the error key is operated, it moves the bar 107 rearwardly and restores the carriage to its normal position. The arm 91ª, which is operated by the total key, lies in front of the bracket 107ᵇ so that when the total key is operated the bar 107 is moved rearwardly just the same as if the error key had been operated or the handle pulled, bar 107 accomplishing in its rearward movement the restoration of the traveling carriage and the pendants 32. Bar 107 is provided with a pin 107ᶜ, which coöperates with a lateral projection 114 extending from a swinging frame 115, said frame consisting of two side pieces pivoted at their lower ends, their upper ends carrying a restoring bar 116 arranged in front of the pendants 32 (see Fig. 3). Thus, when the bar 107 moves rearwardly, pendants 32 and the setting-up bars which carry them, are restored. It is, of course, obvious that the carriage must be restored nearly to its home position at the right hand side of the machine so as to move all of the plates 29 out of locking engagement with the comb plate 39, before the pendants can be restored. For this reason, there is lost motion between pin 107$^c$ and the projection 114.

*The repeat key.*—In order to repeat an example set up in the setting-up devices, that is, introduce a number in said setting-up devices repeatedly into the totalizer without restoring the carriage and the lifting pins 32 to normal position, I mount the arm 109 on shaft 17 so as to slide longitudinally on a key in said shaft against a spring 117 (see Fig. 4), which spring bears upon the hub of the cam plate 52. The bell crank lever 118 engages an annular groove in the hub of arm 109 and is connected to the repeat key 119 which key extends through the casing 2 and is provided with a shoulder 120 for locking it in its inward position. To release the repeat key it is only necessary to move it laterally a slight distance to disengage the shoulder 120 from the casing 2. When the repeat key is pushed inwardly, the arm 109 is moved longitudinally on shaft 17, so as to position the tappet 108 to one side of the plate 107. Thus the handle can be operated repeatedly, the tappet 108 traveling in the path alongside of the plate 107 but not operating said plate. As the plate 107 is not operated, the traveling carriage and the pendants 32 carried thereby are not restored when the handle is operated. Consequently, the number set up in the setting-up devices is introduced into the totalizer as many times as the handle is operated.

*Compelling a full key-stroke.*—Referring to Figs. 18 to 20: 120 indicates a star-wheel, in the form of a coarse toothed ratchet wheel, to which is conjoined a smaller ratchet wheel 121, having the same number of teeth as the wheel 120. Whenever a digit key bar is operated, the arms 50 (in which the bar 51 is mounted) are operated, and, as has heretofore been explained, but one key can be operated at a time—the bar 51 locking the other keys against operation. One of the arms 50, which may be termed an escapement fork or lever, is provided with an overhand 122 on which is pivotally mounted a hooked pawl 123, constituting an impulse ratchet, for coöperating with the ratchet wheel 121. A spring 124 holds the pawl in engagement with its ratchet wheel. Teeth 125 are formed on the underside of the overhang for coöperating with the teeth of wheel 120. A spring-pressed notched restraining pawl 126, mounted on the base plate 1, also coöperates with the teeth of wheel 120. 127 is a hooked extension constituting a stop pallet, on arm 50 which coöperates with the teeth of wheel 120 opposite the impulse pawl 123. The operation of this full-stroke mechanism is as follows: The normal position of the parts is shown in Fig. 18. When a key is depressed, the bar 51 is raised and the arm 50 is lifted, with the result that the pawl 123 rotates the ratchet wheels 120—121. The tooth of wheel 121, lying immediately above the stop pallet 127, will pass therebelow, the tooth which lies under the teeth 125 will pass under said teeth 125, and the tooth at the bottom of the series of notches in pawl 126, will ride over said notches in its upward travel, until, as shown in Fig. 19, the tooth above the one first mentioned will engage the hooked extension 127, thus arresting the downward movement of the digit key and insuring an even stroke with respect to all of the keys; the second mentioned tooth will have passed under the teeth 125, and the last mentioned tooth will lie above the pawl 126. The "drag" of pawl 123 cannot, therefore, reversely rotate the wheels 120—121, and disarrange the relation of the teeth thereof to the other parts with which they coöperate. Should the key be released before a full stroke is made, the teeth 125 will engage the tooth of wheel 121 in operative relation thereto, and prevent the disarrangement of the relation between the pawl 123 and the tooth of wheel 120 with which it is in engagement, and the notches in pawl 126 will prevent backward rotation of wheel 121, hence the key will be locked mid-stroke, and it is necessary to complete the stroke before the star-wheel and its associate parts will be placed in position to permit the key to rise.

I am aware that minor changes in the construction, arrangement and combination of the several parts of my device can be made and substituted for those herein shown and described, without in the least departing from the nature and principle of my invention.

Having thus described my invention, what I claim is:

1. In a calculating machine, the combination of a carriage, setting up bars in said carriage, a digit key, means operated by said key for successively positioning said bars, and a stop, also operated by said key to arrest the movement of said bars.

2. In a calculating machine the combination of a carriage, setting up bars in said carriage, digit keys, means operated by said keys to effect a lateral step-by-step movement of said carriage, means operated by said keys for successively moving said bars longitudinally and a series of stops positioned by said keys for arresting the longitudinal movement of said bars.

3. In a calculating machine the combination of a carriage, setting up bars in said carriage, digit keys, means operated by said keys for effecting a step-by-step lateral movement of said carriage, and means operated by any digit key for moving a setting up bar longitudinally, and a stop for said set of bars, which stop is positioned by the operative digit key.

4. In a calculating machine, the combination with a laterally moving traveling carriage, longitudinally movable setting up bars therein, digit keys for successively moving said bars longitudinally and effecting the lateral movement of said carriage, and means for holding said bars in their adjusted positions.

5. In a calculating machine, the combination of a series of digit keys, a plurality of setting-up bars, a series of stops positioned by said keys respectively, means common to said digit keys for moving a setting-up bar against a positioned stop, and means for successively bringing said setting-up bars into position to coöperate with said stops and said moving means.

6. In a calculating machine, the combination of a traveling carriage containing a series of setting-up bars, means for effecting step by step travel of said carriage, digit keys, stops controlled by said digit keys for arresting the setting-up bars in different positions as they are successively brought under control of said stops, and means common to all of said digit keys for actuating the setting-up bars.

7. In a calculating machine, the combination of a plurality of setting-up bars, stop bars for controlling said setting-up bars, and means for moving said stop bars laterally and upwardly into the path of movement of a setting-up bar.

8. In a calculating machine, the combination of a traveling carriage and its setting-up bars, a series of stop bars having inclined ends and means for moving a selected stop bar laterally and upwardly into the path of the setting-up bar.

9. In a calculating machine, the combination of a traveling carriage and its setting-up bars, of stop bars for arresting the setting-up bars in differential positions, means for positioning said stop bars and simultaneously moving the setting-up bars thereagainst, and an escapement mechanism for effecting a step by step movement of the carriage.

10. In a calculating machine, the combination of a series of digit keys, an escapement mechanism controlled thereby, a traveling carriage which is stepped laterally upon the operation of said escapement mechanism on the upward movement of an operated digit key, a series of setting-up bars mounted in said carriage, a series of stop bars for arresting the setting-up bars in differential positions upon the depression of a digit key, and means operated by a digit key for moving a setting-up bar until arrested by the positioned stop bar.

11. In a calculating machine, the combination of a totalizer and its actuating racks, of a series of actuating devices for said racks, and means for differentially moving said actuating devices into various positions to control the movement of said racks.

12. In a calculating machine, the combination of a totalizer and its actuating racks, of a series of liftable actuating devices therefor, means for lifting said devices, and means for differentially moving said liftable devices between said lifting means and said actuating devices.

13. In a calculating machine, the combination of a totalizer, actuating racks therefor, a stepped frame, and means variably positioned between said racks and said stepped frame for imparting differential movements to said totalizer.

14. In a calculating machine, the combination of a totalizer, actuating racks therefor, a stepped frame for actuating said racks, and means variably interposed between said racks and said frame whereby said racks may be moved varying distances.

15. In a calculating machine, the combination of a totalizer, actuating racks therefor, a rack actuating frame, a traveling carriage and means in said carriage designed to be interposed between said racks and frame for moving the racks varying distances.

16. In a calculating machine, the combination of a totalizer, actuating racks therefor, frame for moving said racks, a traveling carriage, setting-up bars mounted in said carriage, means for actuating said setting-up bars and effecting the travel of said carriage, and devices carried by said setting-up bars and designed to be interposed between the racks and the frame for moving the racks varying distances.

17. In a calculating machine, the combination of a totalizer, actuating racks therefor, a frame for actuating said racks, a traveling carriage, setting-up bars mounted in said carriage, digit keys, a series of stops controlled by said digit keys for arresting the movement of the setting-up bars in different positions, and means common to said series of keys for moving a setting-up bar against a positioned stop and effecting the travel of said carriage.

18. In a calculating machine, the combination of a totalizer, actuating racks therefor, a frame for actuating said racks, a traveling carriage, a plurality of setting-up bars mounted in said carriage, digit keys, a series of stops positioned by said keys respectively, means common to said digit keys for moving a setting-up bar against a positioned stop, and means for successively bringing said setting-up bars under control of said stops and into control of said racks.

19. In a calculating machine, the combination of a totalizer, actuating racks therefor, a frame for actuating said racks, a traveling carriage, an escapement mechanism for effecting a step by step movement of the carriage, setting-up bars mounted in the carriage, stop bars for arresting the setting-up bars in differential positions, and digit keys for positioning said stop bars and simultaneously moving the setting-up bars thereagainst.

20. In a calculating machine, the combination of a totalizer, actuating racks therefor, a frame for actuating said racks, a traveling carriage, devices in said carriage which are normally beyond the control of said traveling frame and said actuating racks, and means for successively bringing said devices under control of said frame and into control of said racks.

21. In a calculating machine, the combination of a totalizer, actuating racks therefor, a frame for actuating said racks, devices which are interposed differentially between said frame and said racks for bringing the racks under control of said frame, and means for differentially positioning said devices.

22. In a calculating machine, the combination of a totalizer, actuating racks therefor, a frame for actuating said racks, devices which are interposed differentially between said frame and said racks for bringing the racks under control of said frame, and means for successively and selectively differentially positioning said devices.

23. In a calculating machine, the combination of a totalizer, actuating racks therefor, a frame for moving said racks, and devices which are selectively positioned and successively brought within the zone of influence of said frame for moving said racks.

24. In a calculating machine, the combination of a totalizer, actuating racks therefor, a frame for actuating said racks, a traveling carriage, movable devices mounted in said carriage, means for setting-up said movable devices and successively interposing them between the frame and said racks.

25. In a calculating machine, the combination of a totalizer, actuating racks therefor, a frame for actuating said racks, a keyboard, devices which are differentially positioned by said keys and interposed between said frame and racks, and means for locking said devices in their differentially interposed position.

26. In a calculating machine, the combination of a totalizer, actuating racks therefor, a frame for actuating said racks, a traveling carriage, a series of setting-up devices mounted in said carriage, a key-board, means operated by the keys for positioning said setting-up devices, and a lock for locking said setting-up devices in their adjusted positions while permitting the carriage to travel.

27. In a calculating machine, the combination of a series of vertically movable racks, arms extending therefrom, lifting devices which are designed to be differentially positioned under said arms, means for differentially moving said devices and a lifting frame coöperating with said positioned devices.

28. In a calculating machine, the combination of a series of vertically movable racks, each provided with an arm, a traveling carriage, setting-up bars mounted in said carriage, and keys for positioning said setting-up bars and effecting the travel of said carriage so as to locate the positioned setting-up bar under said arms.

29. In a calculating machine, the combination of a totalizer, a series of vertically movable racks coöperating therewith, each of said racks having an arm, a traveling carriage containing adjustable elements which coöperate with said arms to lift said racks, and a stepped lifting frame for coöperating with said adjustable elements.

30. In a calculating machine, the combination of a totalizer, actuating racks therefor, each rack having an arm extending at an angle thereto, a series of digit keys, a plurality of setting-up bars, a series of stops positioned by said keys respectively, means common to said digit keys for moving a setting-up bar against a positioned stop, and means for successively bringing said setting-up bars into position to coöperate with said steps and said moving means.

31. In a calculating machine, the combination of a totalizer, actuating racks therefor, each of said racks having an arm extending at an angle thereto, a traveling carriage containing a series of setting-up devices, means for effecting step by step movement of said carriage, digit keys, stops controlled by said digit keys for arresting said setting-up devices in different positions as they are successively brought under control of said stops, and under control of said arm, and means common to all of said digit keys for actuating the subjective setting-up bar.

32. In a calculating machine, the combination of a totalizer, actuating racks therefor, each rack being provided with an arm extending at an angle thereto, a series of actuating devices coöperating with said arms, and means for differentially moving and differentially positioning said actuating devices.

33. In a calculating machine, the combination of a totalizer, actuating racks therefor, each rack being provided with an arm extending at an angle thereto, means for actuating said racks, said means comprising liftable devices which are differentially positioned under said arms, means for differentially moving said devices, and means for lifting said liftable devices.

34. In a calculating machine, the combination of a totalizer, actuating racks therefor, each rack having an arm extending at an angle thereto, a stepped frame, and means variably positioned between said arms and said stepped frame for imparting a differential movement to said racks.

35. In a calculating machine, the combination of a totalizer, actuating racks therefor, each rack having an arm extending at an angle thereto, a stepped frame for actuating said racks, adjustable elements which are interposed between said frame and said rack-arms, and means for adjusting said elements.

36. In a calculating machine, the combination of a totalizer, actuating racks therefor, each of said racks having an arm arranged at an angle thereto, a rack-actuating frame, a traveling carriage, and adjustable elements mounted in said carriage and designed to be interposed between said rack-arms and frame, whereby the racks are moved varying distances.

37. In a calculating machine, the combination of a totalizer, actuating racks therefor, printing type carried by said racks, a series of actuating devices for said racks, means for differentially moving said devices to control the movement of said racks, and type hammers which are operated to make a printing impression when the racks are positioned.

38. In a calculating machine, the combination of a totalizer, actuating racks therefor, printing type carried by said actuating racks, an actuating frame, means variably interposed between said racks and said frame for imparting differential movements to said racks, means for differentially moving said elements, and type hammers which are operated to make a printing impression when the racks are positioned.

39. In a calculating machine, the combination of a totalizer, actuating racks therefor, a movable frame, adjustable elements differentially interposed between said frame and said racks for moving the latter different distances, type which are positioned by said racks, means for differentially moving said elements, a platen for containing paper on which a printing impression is made by said type and paper feeding devices which are operated by said movable frame.

40. In a calculating machine, the combination of a totalizer, vertically movable racks coöperating therewith, a frame for lifting said racks, adjustable elements differentially interposed between said frame and racks, whereby said racks are lifted different distances, means for differentially moving said elements, type carried by the upper ends of said rack, a laterally movable paper carriage and means for line-spacing the paper in said paper carriage.

41. In a calculating machine, the combination of a totalizer, racks coöperating therewith, a total key for causing said totalizer to mesh with said racks, and means whereby said totalizer actuates said racks.

42. In a calculating machine, the combination of a totalizer, racks coöperating therewith and normally disengaged therefrom, printing type whose position is controlled by said racks, a total key for effecting an engagement between said racks and said totalizer, and parts moved into position by said total key, whereby the totalizer positions the racks and their controlled printing type.

43. In a calculating machine, the combination of totalizer wheels, racks coöperating therewith normally disengaged therefrom, printing type whose position is controlled by said racks, a power shaft, a total key for engaging the racks with said wheels, and means for connecting the totalizer wheels with the power shaft, whereby when said power shaft is operated, said totalizer wheels position said racks and their controlled printing type.

44. In a calculating machine, the combination of actuating racks, differentially positioned devices for controlling the movement of said racks, totalizer wheels normally disengaged from said racks, means for engaging said totalizer wheels with said racks whereby the racks act as driving elements in additive operations, a power shaft, and means for connecting said totalizer wheels to said power shaft, whereby they are reversely rotated and act as driving elements in total-taking operations.

45. In a calculating machine, the combination of actuating racks, differentially positioned devices for controlling the movement of said racks, totalizer wheels normally disengaged from said racks, each of which is provided with a lateral projection, a power shaft, and a revoluble element for coöperating with said projections upon the operation of the power shaft to positively drive the totalizer wheels part of a revolution in total-taking operations.

46. In a calculating machine, the combination of actuating racks, differentially positioned devices for controlling the movement of said racks, totalizer wheels normally disengaged from said racks, each of which is provided with a lateral projection, a shaft on which said wheels are loosely mounted, said racks independently operating said wheels in additive operations, and means for connecting said wheels to said shaft in total-taking operations.

47. In a calculating machine, the combination of actuating racks, differentially positioned devices for controlling the movement of said racks, a totalizer composed of independently movable gear wheels, a shaft on which said wheels are loosely mounted, said racks operating said wheels in additive operations, and means for coupling said wheels to said shaft in total-taking operations.

48. In a calculating machine, the combination of actuating racks, differentially positioned devices for controlling the movement of said racks, a totalizer composed of independently movable wheels, a shaft on which said wheels are loosely mounted, means for coupling said wheels to said shaft, and a total key for operating said coupling means.

49. In a calculating machine, the combination of actuating racks, differentially positioned devices for controlling the movement of said racks, a totalizer composed of independently movable wheels, a shaft on which said wheels are loosely mounted, each of said wheels being provided with a lateral projection, and a comb plate movable longitudinally said shaft into and out of engagement with said lateral projections.

50. In a calculating machine, the combination of actuating racks, differentially positioned devices for controlling the movement of said racks, a totalizer composed of independently movable wheels, a shaft on which said wheels are loosely mounted, means for effecting a driving engagement between said shaft and said wheels, and means for rotating the shaft when in such driving engagement.

51. In a calculating machine, the combination of actuating racks, differentially positioned devices for controlling the movement of said racks, a totalizer composed of independently movable wheels, a shaft on which said wheels are loosely mounted, means whereby said wheels are coupled to said shaft, a total key for effecting said coupling operation, and a power shaft for driving the wheels when so coupled, whereby said racks are positioned by said totalizer wheels.

52. In a calculating machine, the combination of a total key, a keeper plate for holding the same in an adjusted position, and means for disengaging said total key from said keeper plate, said disengaging means, however, restraining said total key against movement.

53. In a calculating machine, the combination of a total key, a spring for holding the same in normal position, a keeper plate which is engaged by a shoulder on said total key when said total key is moved to an operative position, and means for disengaging said total key from said keeper plate, said means temporarily restraining said total key against upward movement under the impelling action of its spring.

54. In a calculating machine, the combination of a movable frame, a yielding rack carried by said frame and a gear wheel movable longitudinally its shaft with which said rack coöperates in the different positions of the frame and a shaft on which said gear wheel is mounted.

55. In a calculating machine, the combination of a movable frame, a rack mounted upon said frame, springs for holding said rack projected and a gear wheel with which said spring-held rack coöperates.

56. In a calculating machine, the combination of a movable frame, a yielding rack carried thereby, a pivoted frame, and a gear wheel carried by said pivoted frame movable longitudinally its shaft, which gear meshes with said yielding rack in the different positions of the pivoted frame and a shaft on which said gear wheel is mounted.

57. In a calculating machine, the combination of a rack-actuating frame, a totalizer shaft, a pivoted frame on which said shaft is mounted, a gear on said shaft and a yielding rack on said actuating frame which is in driving mesh with said gear in the different positions of said pivoted frame.

58. In a calculating machine, the combination of a totalizer, actuating racks therefor, a frame for moving said racks, a pivoted frame in which the shaft of said totalizer is mounted, a gear arranged on said shaft and a yielding rack carried by the rack actuating frame for meshing with said gear in the different positions of said pivoted frame.

59. In a calculating machine, the combination of totalizer wheels, a shaft on which they are loosely mounted, means for effecting a driving connection between said shaft and wheels, said means including a gear arranged on said shaft, a pivoted frame in which said shaft is mounted, actuating racks for the totalizer wheels, a frame for moving said racks, a yielding rack mounted on said frame for driving said gear in the different positions of the pivoted frame and means for disengaging said yielding rack and gear when the driving operation is complete.

60. In a calculating machine, the combination of totalizer wheels, a shaft on which they are loosely mounted, means carried by said shaft for placing said shaft in driving connection with said totalizer wheels, a gear slidingly mounted on the shaft for operating said last mentioned wheels, a spring for normally holding said gear and its connected parts in an inoperative position, a total key for placing said gear in operative position, and a power shaft and its connections whereby said gear is driven when in an operative position.

61. In a calculating machine, the combination of totalizer wheels, a shaft on which they are mounted, means on said shaft for placing the same in driving connection with said wheels, a gear mounted on said shaft and joined to said last mentioned means, a pivoted frame in which all of the above mentioned parts are mounted, racks coöperating with said totalizer wheels, and a total key for placing said gear and its conjoined parts in operative position, said total key also moving said pivoted frame so as to effect an engagement between the totalizer wheels and their coöperating racks.

62. In a calculating machine, the combination of actuating racks, differentially positioned devices for controlling the movement of said racks, totalizer wheels, means for effecting an engagement between said racks and said totalizer wheels, whereby said totalizer wheels are driven by said racks in additive operations, a power shaft for operating said racks, and means for changing the relation between the adding wheels and said racks whereby said adding wheels are driven by said power shaft and in turn position said racks.

63. In a calculating machine, the combination of actuating racks, differentially positioned devices for controlling the movement of said racks, totalizer wheels, means for effecting an engagement between said racks and said totalizer wheels, whereby said totalizer wheels are driven by said racks in additive operations, a power shaft for operating said racks, and a total key and its connections for changing the relation between the adding wheels and said racks whereby said adding wheels are driven by said power shaft and in turn position said racks.

64. In a calculating machine, the combination of actuating racks, differentially positioned devices for controlling the movement of said racks, totalizer wheels, said racks coöperating therewith for driving said wheels in additive operations, and means for constituting said totalizer wheels as driving elements for positioning the racks in total-taking operations.

65. In a calculating machine, the combination of digit keys, setting-up bars which are successively positioned thereby, movable elements carried by said bars, and stops which are positioned by the operated digit key to arrest the movement of the setting-up bar being positioned.

66. In a calculating machine, the combination of digit keys, setting-up bars, a carriage in which said setting-up bars are mounted, an escapement mechanism for operating said carriage for effecting a step-by-step movement thereof, movable elements carried by said bars, and means operated by said digit keys for moving said setting-up bars, and stops which are moved by said keys into the path of the bar being moved.

67. In a calculating machine, the combination of a series of digit keys, a traveling carriage, an escapement mechanism operated by said digit keys for effecting a step-by-step movement of said carriage, movable setting-up devices mounted in said carriage which are successively brought under the control of said keys, and means operated by any digit key of the series for positioning the setting-up device under control of said keys by moving the same in a direction transverse the direction of movement of the carriage.

68. In a calculating machine, the combination of a series of digit keys, a traveling carriage, an escapement mechanism operated by said digit keys for effecting a step-by-step movement of said carriage, movable setting-up devices mounted in said carriage which are successively brought under the control of said keys, means operated by any digit key of the series for positioning the setting-up device under control of said keys by moving the same in a direction transverse the direction of movement of the carriage, and stops which are positioned by said keys for arresting the transverse movement of said setting-up device.

69. In a calculating machine, the combination of a series of digit keys, a plurality of setting-up bars, movable elements carried by said bars, a series of stops positioned by said keys respectively, means common to said digit keys for moving a setting-up bar against a positioned stop, and means for successively bringing said setting-up bars into position to coöperate with said stops and said moving means.

70. In a calculating machine, the combination of a traveling carriage containing a series of setting-up bars, movable elements carried by said bars, means for effecting step by step travel of said carriage, digit keys, stops controlled by said digit keys for arresting the setting-up bars in different positions as they are successively brought under control of said stops, and means common to all of said digit keys for actuating the setting-up bars.

71. In a calculating machine, the combination of a traveling carriage and its setting-up bars, movable elements carried by said bars, of stop bars for arresting the setting-up bars in differential positions, means for positioning said stop bars and simultaneously moving the setting-up bars thereagainst, and an escapement mechanism for effecting a step by step movement of the carriage.

72. In a calculating machine, the combination of a series of digit keys, an escapement mechanism controlled thereby, a traveling carriage which is stepped laterally upon the operation of said escapement mechanism on the upward movement of an operated digit key, a series of setting-up bars mounted in said carriage, movable elements carried by said bars, a series of stop bars for arresting the setting-up bars in differential positions upon the depression of a digit key, and means operated by a digit key for moving a setting-up bar until arrested by the positioned stop bar.

73. In a calculating machine, the combination of a totalizer and its actuating racks, means for actuating said racks, said means comprising setting-up bars and movable elements carried by said setting-up bars.

74. In a calculating machine, the combination of a totalizer, actuating racks therefor, a stepped frame, setting-up bars which are moved between said racks and said stepped frame, and movable elements carried by said bars for coöperating with said frame and racks.

75. In a calculating machine, the combination of a totalizer, actuating racks therefor, a rack actuating frame, a traveling carriage, setting-up bars mounted in said carriage, and movable elements carried by said setting-up bars and designed to be interposed between said racks and frame, whereby the racks are moved varying distances.

76. In a calculating machine, the combination of a totalizer, actuating racks therefor, a frame for actuating said racks, a traveling carriage, setting-up bars mounted in said carriage, movable elements carried by said bars, digit keys, a series of stops controlled by said digit keys for arresting the movement of the setting-up bars in different positions, and means common to said series of keys for moving a setting-up bar against a positioned stop and effecting the travel of said carriage.

77. In a calculating machine, the combination of a totalizer, actuating racks therefor, a frame for actuating said racks, a traveling carriage, an escapement mechanism for effecting a step by step movement of the carriage, setting-up bars mounted in the carriage, movable elements carried by said bars, stop bars for arresting the setting-up bars in differential positions, and digit keys for positioning said stop bars and simultaneously moving the setting-up bars thereagainst.

78. In a calculating machine, the combination of a totalizer, actuating racks therefor, each rack having an arm extending at an angle thereto, a series of digit keys, a plurality of setting-up bars, movable elements carried by said bars, a series of stops positioned by said keys respectively, means common to said digit keys for moving a setting-up bar against a positioned stop, and means for successively bringing said setting-up bars into position to coöperate with said steps and said moving means.

79. In a calculating machine, the combination of a digit key, a setting-up bar which is positioned thereby, an element movable at an angle to the direction of movement of said bar, and a stop which is also positioned by said digit key to arrest the movement of the said setting-up bar.

80. In a calculating machine, the combination of a digit key, a setting-up bar, an element movable at an angle to the direction of movement of said bar, and means operated by said digit key for moving said setting-up bar and coincidentally moving a stop in the path of said bar.

81. In a calculating machine, the combination of a series of digit keys, a setting-up bar, an element movable at an angle to the direction of movement of said bar, means operated by any digit key of the series for moving the said setting-up bar and co-incidentally moving a stop in the path of said bar.

82. In a calculating machine, the combination of a series of digit keys, a setting-up bar which is positioned thereby, an element movable at an angle to the direction of movement of said bar, a series of stops controlled by said digit keys respectively for arresting the movement of said bar in different positions, and means common to said series of keys for moving said bar against a positioned stop.

83. In a calculating machine, the combination of a series of digit keys, a plurality of setting-up bars, an element movable at an angle to the direction of movement of said bar, a series of stops positioned by said keys respectively, means common to said digit keys for moving a setting-up bar against a positioned stop, and means for successively bringing said setting-up bars into position to coöperate with said stops and said moving means.

84. In a calculating machine, the combination of a traveling carriage containing a series of setting-up bars, elements movable at an angle to the direction of movement of said bars, means for effecting step by step travel of said carriage, digit keys, stops controlled by said digit keys for arresting the setting-up bars in different positions as they are successively brought under control of said stops, and means common to all of said digit keys for actuating the setting-up bars.

85. In a calculating machine, the combination of a plurality of setting-up bars, elements movable at an angle to the direction of movement of said bars, stop bars for controlling said setting-up bars, and means for moving said stop bars laterally and upwardly into the path of movement of a setting-up bar.

86. In a calculating machine, the combination of a traveling carriage, and its setting-up bars, elements movable at an angle to the direction of movement of said bars, stop bars for arresting the setting-up bars in differential positions, means for positioning said stop bars and simultaneously moving the setting-up bars thereagainst, and an escapement mechanism for effecting a step by step movement of the carriage.

87. In a calculating machine, the combination of a series of digit keys, an escapement mechanism controlled thereby, a traveling carriage which is stepped laterally upon the operation of said escapement mechanism on the upward movement of an operated digit key, a series of setting-up bars mounted in said carriage, elements movable at an angle to the direction of movement of said bars, a series of stop bars for arresting the setting-up bars in differential positions upon the depression of a digit key, and means operated by a digit key for moving a setting-up bar until arrested by the positioned stop bar.

88. In a calculating machine, the combination of a totalizer, actuating racks therefor, a frame for actuating said racks, a traveling carriage, setting-up bars mounted in said carriage, elements movable at an angle to the direction of movement of said bars, digit keys, a series of stops controlled by said digit keys for arresting the movement of the setting-up bars in different positions, and means common to said series of keys for moving a setting-up bar against a positioned stop and effecting the travel of said carriage.

89. In a calculating machine, the combination of a totalizer, actuating racks therefor, a frame for actuating said racks, a traveling carriage, an escapement mechanism for effecting a step by step movement of the carriage, setting-up bars mounted in the carriage, elements movable at an angle to the direction of movement of said bars, stop bars for arresting the setting-up bars in differential positions, and digit keys for positioning said stop bars and simultaneously moving the setting-up bars thereagainst.

90. In a calculating machine, the combination of a totalizer, actuating racks therefor, each rack having an arm extending at an angle thereto, a series of digit keys, a plurality of setting-up bars, elements movable at an angle to the direction of movement of said bars, a series of stops positioned by said keys respectively, means common to said digit keys for moving a setting-up bar against a positioned stop, and means for successively bringing said setting-up bars into position to coöperate with said stops and said moving means.

91. In a calculating machine, the combination of a totalizer, actuating racks therefor, a rack-actuating frame, a traveling carriage and means in said carriage designed to be variably interposed between said racks and frame for moving the racks varying distances.

92. In a calculating machine, the combination of a totalizer, actuating racks therefor, a plurality of variably positionable setting-up bars, movable elements carried thereby, and a frame for actuating said movable elements and thereby actuating said racks.

93. In a calculating machine, the combination of a totalizer, actuating racks therefor, a plurality of variably positionable setting-up bars, movable elements carried thereby, and a frame for variably actuating said movable elements and thereby variably actuating said racks.

94. In a calculating machine, the combination of a totalizer, actuating racks therefor, a frame for actuating said racks, devices which are interposed between said frame and said racks, bringing the racks under control of said frame, and means for differentially moving said devices.

95. In a calculating machine, the combination of a series of vertically movable racks, a traveling carriage, setting-up bars in said carriage, lifting devices which are variably positioned with respect to said racks for lifting them, a frame for coöperating with said lifting devices, a totalizer, a swinging frame in which said totalizer is mounted, a power shaft, and means operated by the power shaft for lifting said devices and racks under control thereof, said means also effecting the engagement and disengagement between said totalizer and said racks.

96. In a calculating machine, the combination of a series of vertically movable racks, arms extending therefrom, lifting devices which are designed to be vertically positioned under said arms, means for differentially moving said devices to position and a lifting frame coöperating with said lifting devices.

97. In a calculating machine, the combination of a series of racks, arms extending therefrom, setting-up bars, movable elements carried by said setting-up bars, which are designed to coöperate with said rack-arms, and a movable frame coöperating with said elements.

98. In a calculating machine, the combination of a series of racks, setting-up bars having elements movable at an angle to the direction of movement of said bars for coöperating with said racks, means for variably positioning said setting-up bars and their carried part, and a frame for coöperating with the positioned elements.

99. In a calculating machine, the combination of a total key, a keeper plate for holding the same in an adjusted position, an operating handle and means for automatically disengaging said total key from said keeper plate at the beginning of the return movement of the handle, said means temporarily restraining said total key from being restored to normal position.

100. In a calculating machine, the combination of a total key, a keeper plate for holding the same in an adjusted position, means for automatically releasing said total key at the beginning of the reverse movement of the power shaft, said means temporarily restraining said total key from being restored to its normal position.

101. In a calculating machine, the combination of a movable frame, a rack carried by said frame and movable in a direction transverse the movement of said frame, and a gear wheel with which said rack coöperates in the different positions of the frame.

102. In a calculating machine, the combination of a movable frame, a rack mounted upon said frame, means for holding said rack projected, and a gear wheel with which said rack coöperates.

103. In a calculating machine, the combination of a movable frame, a rack mounted thereon and capable of being moved independently in said frame, and a gear with which said rack coöperates.

104. In a calculating machine, the combination of a lifting frame, a laterally movable rack mounted on said frame, and a gear with which said rack coöperates in the different positions of said frame.

105. In a calculating machine, the combination of a movable frame, a laterally movable rack carried by said frame, and a displaceable gear with which said rack coöperates.

106. In a calculating machine, the combination of a totalizer, racks coöperating therewith, a frame for actuating said racks, rock-arms having a link connection with said frame, and a cam coöperating with said rock-arms.

107. In a calculating machine, the combination of a totalizer, racks coöperating therewith, a frame for actuating said racks, rock-arms having a link connection with said frame, said arms having a lateral projection, a power shaft, and a cam plate mounted on said power shaft for coöperating with said lateral projection.

108. In a calculating machine, the combination of a traveling carriage, setting-up devices mounted therein and movable transverse the direction of travel of the carriage and friction devices coöperating with said setting-up devices.

109. In a calculating machine, the combination of setting-up devices, means for positioning said devices and friction devices coöperating with said setting-up devices to hold them in differentially adjusted positions.

110. In a calculating machine, the combination of a traveling carriage, setting-up bars mounted therein, means for moving said bars in said carriage, movable elements carried by said bars, and friction devices coöperating with said bars to hold them in adjusted positions.

111. In a calculating machine, the combination of a digit key, a setting-up bar which is positioned thereby, a stop which is also positioned by said digit key to arrest the movement of the said setting-up bar, and an error key for restoring said setting-up bar to normal position.

112. In a calculating machine, the combination of a digit key, a setting-up bar, means operated by said digit key for moving said setting-up bar and coincidentally moving a stop in the path of said bar, and an error key for restoring said setting-up bar to normal position.

113. In a calculating machine, the combination of a series of digit keys, a setting-up bar, means operated by any digit key of the series for moving the said setting-up bar and coincidentally moving a stop in the path of said bar, and an error key for restoring said setting-up bar to normal position.

114. In a calculating machine, the combination of a series of digit keys, a setting-up bar which is positioned thereby, a series of stops controlled by said digit keys respectively for arresting the movement of said bar in different positions, means common to said series of keys for moving said bar against a positioned stop, and an error key for restoring said setting-up bar to normal position.

115. In a calculating machine, the combination of a series of digit keys, a plurality of setting-up bars, a series of stops positioned by said keys respectively, means common to said digit keys for moving a setting-up bar against a positioned stop, means for successively bringing said setting-up bars into position to coöperate with said stops and said moving means, and an error key for restoring said setting-up bar to normal position.

116. In a calculating machine, the combination of a digit key, a setting-up bar which is positioned thereby, a movable element carried by said bar, a stop which is also positioned by said digit key to arrest the movement of the said setting-up bar, and an error key for restoring said setting-up bar to normal position.

117. In a calculating machine, the combination of a digit key, a setting-up bar, a movable element carried by said bar, means operated by said digit key for moving said setting-up bar and coincidentally moving a stop in the path of said bar, and an error key for restoring said setting-up bar to normal position.

118. In a calculating machine, the combination of a series of digit keys, a setting-up bar, a movable element carried by said bar, means operated by any digit key of the series for moving the said setting-up bar and coincidentally moving a stop in the path of said bar, and an error key for restoring said setting-up bar to normal position.

119. In a calculating machine, the combination of a series of digit keys, a setting-up bar which is positioned thereby, a movable element carried by said bar, a series of stops controlled by said digit keys respectively for arresting the movement of said bar in different positions, means common to said series of keys for moving said bar against a positioned stop, and an error key for restoring said setting-up bar to normal position.

120. In a calculating machine, the combination of a series of digit keys, a plurality of setting-up bars, movable elements carried by said bars, a series of stops positioned by said keys respectively, means common to said digit keys for moving a setting-up bar against a positioned stop, means for successively bringing said setting-up bars into position to coöperate with said stops and said moving means, and an error key for restoring said setting-up bar to normal position.

121. In a calculating machine, the combination of a digit key, a setting-up bar which is positioned thereby, an element movable at an angle to the direction of movement of said bar, a stop which is also positioned by said digit key to arrest the movement of the said setting-up bar, and an error key for restoring said setting-up bar to normal position.

122. In a calculating machine, the combination of a digit key, a setting-up bar, an element movable at an angle to the direction of movement of said bar, means operated by said digit key for moving said setting-up bar and coincidentally moving a stop in the path of said bar, and an error key for restoring said setting-up bar to normal position.

123. In a calculating machine, the combination of a series of digit keys, a setting-up bar, an element movable at an angle to the direction of movement of said bar, means operated by any digit key of the series for moving the said setting-up bar and coincidentally moving a stop in the path of said bar, and an error key for restoring said setting-up bar to normal position.

124. In a calculating machine, the combination of a series of digit keys, a setting-up bar which is positioned thereby, an element movable at an angle to the direction of movement of said bar, a series of stops controlled by said digit keys respectively for arresting the movement of said bar in different positions, means common to said series of keys for moving said bar against a positioned stop, and an error key for restoring said setting-up bar to normal position.

125. In a calculating machine, the combination of a series of digit keys, a plurality of setting-up bars, elements movable at an angle to the direction of movement of said bars, a series of stops positioned by said keys respectively, means common to said digit keys for moving a setting-up bar against a positioned stop, means for successively bringing said setting-up bars into position to coöperate with said stops and said moving means, and an error key for restoring said setting-up bars to normal position.

126. In a calculating machine, the combination of a traveling carriage containing a series of setting-up bars, means for effecting step by step travel of said carriages, digit keys, stops controlled by said digit keys for arresting the setting-up bars in different positions as they are successively brought under control of said stops, means common to all of said digit keys for actuating the subjective setting-up bar, and an error key for restoring said traveling carriage and its carried parts to normal position.

127. In a calculating machine, the combination of a series of digit keys, an escapement mechanism controlled thereby, a traveling carriage which is stepped laterally upon the operation of said escapement mechanism on the upward movement of an operated digit key, a series of setting-up bars mounted in said carriage, a series of stop bars for arresting the setting-up bars in differential positions upon the depression of a digit key, means operated by a digit key for moving a setting-up bar until arrested by the positioned stop bar, and an error key for restoring said traveling carriage and its carried parts to normal position.

128. In a calculating machine, the combination of a totalizer, actuating racks therefor, a rack actuating frame, a traveling carriage, means in said carriage designed to be interposed between said racks and frame for moving the racks varying distances, and an error key for restoring said traveling carriage and its carried parts to normal position.

129. In a calculating machine, the combination of a totalizer, actuating racks therefor, frame for moving said racks, a traveling carriage, setting-up bars mounted in said carriage, means for actuating said setting-up bars and effecting the travel of said carriage, devices carried by the setting-up bars and designed to be interposed between the racks and the frame for moving the racks varying distances, and an error key for restoring said traveling carriage and its carried parts to normal position.

130. In a calculating machine, the combination of a totalizer, actuating racks therefor, a frame for actuating said racks, a traveling carriage, setting-up bars mounted in said carriage, digit keys, a series of stops controlled by said digit keys for arresting the movement of the setting-up bars in different positions, means common to said series of keys for moving a setting-up bar against a positioned stop and effecting the travel of said carriage, and an error key for restoring said traveling carriage and its carried parts to normal position.

131. In a calculating machine, the combination of a totalizer, actuating racks therefor, a frame for actuating said racks, a traveling carriage, devices in said carriage which are normally beyond the control of said traveling frame and said actuating racks, means for successively bringing said devices under control of said frame and into control of said racks, and an error key for restoring said traveling carriage and its carried parts to normal position.

132. In a calculating machine, the combination of a totalizer, actuating racks therefor, a frame for actuating said racks, a traveling carriage, movable devices mounted in said carriage, means for setting-up said movable devices and successively interposing them between the frame and said racks, and an error key for restoring said traveling carriage and its carried parts to normal position.

133. In a calculating machine, the combination of a totalizer, actuating racks therefor, a frame for actuating said racks, a traveling carriage, a series of setting-up devices mounted in said carriage, a key-board, means operated by the key-board for positioning said setting-up devices, a lock for locking said setting-up devices in their adjusted positions while permitting the carriage to travel, and an error key for restoring said traveling carriage and its carried parts to normal position.

134. In a calculating machine, the combination of a series of vertically movable racks, each provided with an arm, a traveling carriage, setting-up bars mounted in said carriage, keys for positioning said setting-up bars and effecting the travel of said carriage so as to locate the positioned setting-up bar under said arms, and an error key for restoring said traveling carriage and its carried parts to normal position.

135. In a calculating machine, the combination of a totalizer, a series of vertically movable racks coöperating therewith, each of said racks having an arm, a traveling carriage containing adjustable elements which coöperate with said arms to lift said racks, a stepped lifting frame for coöperating with said adjustable elements, and an error key for restoring said traveling carriage and its carried parts to normal position.

136. In a calculating machine, the combination of a totalizer, actuating racks therefor, each of said racks having an arm extending at an angle thereto, a traveling carriage containing a series of setting-up devices, means for effecting step by step movement of said carriage, digit keys, stops controlled by said digit keys for arresting said setting-up devices in different positions as they are successively brought under control of said stops, and into control of said arms, means common to all of said digit keys for actuating the subjective setting-up bar, and an error key for restoring said traveling carriage and its carried parts to normal position.

137. In a calculating machine, the combination of a traveling carriage, setting-up bars mounted therein, movable elements carried by said bars, a power shaft, means operated by said power shaft for restoring said carriage to its normal position and other means also operated by said power shaft for restoring said setting-up bars to their normal position just prior to the carriage reaching its home position.

138. In a calculating machine, the combination of a traveling carriage, setting-up bars mounted therein, means for positioning said bars, means for locking said bars in their adjusted positions, a power shaft, means operated by said power shaft for restoring said carriage to its home position whereby said setting-up bars are released and other means operated by said power shaft for restoring said setting-up bars when they are released.

139. In a calculating machine, the combination of a traveling carriage, setting-up bars mounted therein, movable elements carried by said bars, an error key, means operated by said error key for restoring said carriage to its normal position and other means also operated by said error key for restoring said setting-up bars to their normal position just prior to the carriage reaching its home position.

140. In a calculating machine, the combination of a traveling carriage, setting-up bars mounted therein, means for positioning said bars, means for locking said bars in their adjusted positions, an error key, means operated by said error key for restoring said carriage to its home position whereby said setting-up bars are released and other means operated by said error key for restoring said setting-up bars when they are released.

141. In a calculating machine, the combination of setting-up devices, a rock-arm having a tappet at its end for restoring said setting-up devices, and means for moving said arm and its carried tappet laterally so as to render said restoring devices inoperative.

142. In a calculating machine, the combination of a traveling carriage, horizontally movable setting up devices mounted therein, keys for positioning said setting up devices, an error key for restoring said carriage, and a sweep bar operated by said error key for restoring said setting up devices.

143. In a calculating machine, the combination of a series of denominational key positioned stops, a traveling frame controlled thereby, a totalizer, and totalizer actuating devices operable by said traveling frame.

144. In a calculating machine, the combination of a totalizer, a series of denominational key positioned stops, a movable frame, and totalizer actuating devices moved by said traveling frame and whose excursion is controlled by said stops.

145. In a calculating machine, the combination of a totalizer, actuating devices therefor, a movable frame for operating said actuating devices and a series of denominational key positioned stops interposed between said frame and said actuating devices whereby the excursion of the latter is controlled.

146. In a calculating machine, the combination of a totalizer and its actuating racks, means whereby said racks drive said totalizer wheels, and means whereby said totalizer wheels drive said racks, as in a total-taking operation.

147. In a calculating machine the combination of a totalizer and its actuating racks, a main shaft, means operated by said main shaft for moving said parts into and out of mesh with each other whereby the racks drive the totalizer wheels in registering items therein, a total key, and means operated by said total key whereby the totalizer wheels are thrown into mesh with the racks and constitute driving elements therefor, said total key also rendering inoperative the means operated by the main shaft for throwing the totalizer wheels into and out of mesh with said racks.

148. In a calculating machine the combination of a totalizer, actuating racks therefor, carrying segment coöperating with said totalizer, a comb-plate coöperating with said totalizer wheels to restore them to zero, a slidable gear connected to said comb-plate, and means for locking said gear against rotation except when laterally displaced and in driving connection with said totalizer wheels.

149. In a calculating machine the combination of a totalizer and its actuating racks, a total key, a main operating shaft and connections, and means operated by said total key for throwing the totalizer wheels into mesh with their racks and then placing said totalizer wheels under driving control of said shaft.

150. In a calculating machine, the combination of a series of denominational type carriers, a vibrating frame having a fixed excursion of movement, and devices which are interposed between said type carriers and said frame, whereby the type carriers have imparted to them a differential excursion of movement.

151. In a calculating machine, the combination of a series of denominational type carriers, a frame having a fixed excursion of movement, devices which are interposed between said frame and said type carriers for imparting to the type carriers differential excursions of movement, and adding mechanism operable by said type carriers.

152. In a calculating machine, the combination of a series of denominational type carriers, a frame having a fixed excursion of movement, devices which are interposed between said frame and said type carriers, and means for advancing said carriers from lower to higher orders so as to bring them successively in control of said type carriers.

153. In a calculating machine, the combination of a series of denominational type carriers, a frame having a fixed excursion of movement, devices which are interposed between said frame and said type carriers, means for advancing said carriers from lower to higher orders so as to bring them successively in control of said type carriers, and adding mechanism operated by said type carriers.

In testimony whereof I hereunto affix my signature in the presence of two witnesses, this 5th day of April 1909.

WILLIAM W. HOPKINS.

Witnesses:
  ALMA GEBHART,
  LENORE CLARK.